(12) United States Patent
Nien et al.

(10) Patent No.: US 11,629,552 B2
(45) Date of Patent: Apr. 18, 2023

(54) WINDOW COVERING AND DRIVING DEVICE THEREOF

(71) Applicant: Nien Made Enterprise Co., Ltd., Taichung (TW)

(72) Inventors: Chao-Hung Nien, Taichung (TW); Jui-Pin Jao, Miaoli County (TW); Chin-Chu Chiu, Hsinchu County (TW); Ping-Yu Chu, Hsinchu County (TW)

(73) Assignee: Nien Made Enterprise Co., Ltd., Taichung (TW)

( * ) Notice: Subject to any disclaimer, the term of this patent is extended or adjusted under 35 U.S.C. 154(b) by 288 days.

(21) Appl. No.: 17/002,728

(22) Filed: Aug. 25, 2020

(65) Prior Publication Data

US 2021/0164290 A1 Jun. 3, 2021

(30) Foreign Application Priority Data

Nov. 28, 2019 (TW) .................................. 108215808

(51) Int. Cl.
 *E06B 9/24* (2006.01)
 *F16H 1/46* (2006.01)
 (Continued)

(52) U.S. Cl.
 CPC .................. *E06B 9/24* (2013.01); *F16D 3/12* (2013.01); *F16D 51/04* (2013.01); *F16H 1/46* (2013.01);
 (Continued)

(58) Field of Classification Search
 CPC .................. E06B 2009/725; E06B 9/32; E06B 2009/322; E06B 9/24; E06B 9/262; E06B 9/322; E06B 2009/3222; E06B 9/70; E06B 9/72; E06B 9/60; E06B 9/68; E06B 2009/1625; E06B 2009/2627; F16D 3/12; F16D 51/04; F16D 49/02; F16D 2121/14; F16D 2300/22; F16D 2127/004;
 (Continued)

(56) References Cited

U.S. PATENT DOCUMENTS

| | | | |
|---|---|---|---|
| 7,021,478 B1* | 4/2006 | Hock | B65D 41/045 |
| | | | 215/349 |
| 2006/0052214 A1* | 3/2006 | Ito | A61B 1/0669 |
| | | | 475/330 |

(Continued)

*Primary Examiner* — Charles A Fox
*Assistant Examiner* — Farhana Pervin
(74) *Attorney, Agent, or Firm* — Winston Hsu

(57) ABSTRACT

A window covering includes a housing, a covering material, a spindle, and a driving device. The spindle and the driving device are provided at the housing. The driving device includes a motor having a shaft, and an epicyclic gearing decelerating device having an input end and an output end connected to the shaft and the spindle, respectively. Whereby, the spindle can drive the covering material to expand or to collapse. The epicyclic gearing decelerating device includes a ring portion and at least a planet gear assembly which is coupled between the input end and the output end. The planet gear assembly includes a plurality of planet gears having a Shore A durometer hardness of 45-90, which is rotatable along the fixedly provided ring portion. While being driven to move, a lower end of the covering material moves at a speed higher than 65 mm per second.

26 Claims, 26 Drawing Sheets

(51) Int. Cl.
*F16H 55/06* (2006.01)
*F16D 51/04* (2006.01)
*F16H 57/028* (2012.01)
*F16D 3/12* (2006.01)
*F16H 57/02* (2012.01)
*F16D 121/14* (2012.01)
*E06B 9/262* (2006.01)
*E06B 9/322* (2006.01)
*F16D 49/02* (2006.01)

(52) U.S. Cl.
CPC ............ *F16H 55/06* (2013.01); *F16H 57/028* (2013.01); *E06B 9/262* (2013.01); *E06B 9/322* (2013.01); *F16D 49/02* (2013.01); *F16D 2121/14* (2013.01); *F16D 2300/22* (2013.01); *F16H 2057/02034* (2013.01); *F16H 2057/02039* (2013.01)

(58) Field of Classification Search
CPC ............ F16D 59/00; F16H 1/46; F16H 55/06; F16H 57/028; F16H 2057/02034; F16H 2057/02039; F16H 3/46; F16H 3/44; F16H 3/52; F16H 2200/2005
See application file for complete search history.

(56) References Cited

U.S. PATENT DOCUMENTS

| | | | |
|---|---|---|---|
| 2009/0090805 A1* | 4/2009 | Hwaung | E06B 9/72 160/310 |
| 2009/0176615 A1* | 7/2009 | Gasparrini | F16H 1/46 475/331 |
| 2015/0300086 A1* | 10/2015 | Chen | E06B 9/60 160/317 |
| 2016/0017656 A1* | 1/2016 | Adreon | E06B 9/42 160/7 |
| 2016/0329448 A1* | 11/2016 | Chou | H01L 31/0547 |
| 2020/0378182 A1* | 12/2020 | Heredia | C25D 3/56 |
| 2021/0172509 A1* | 6/2021 | Smook | F16H 1/46 |

* cited by examiner

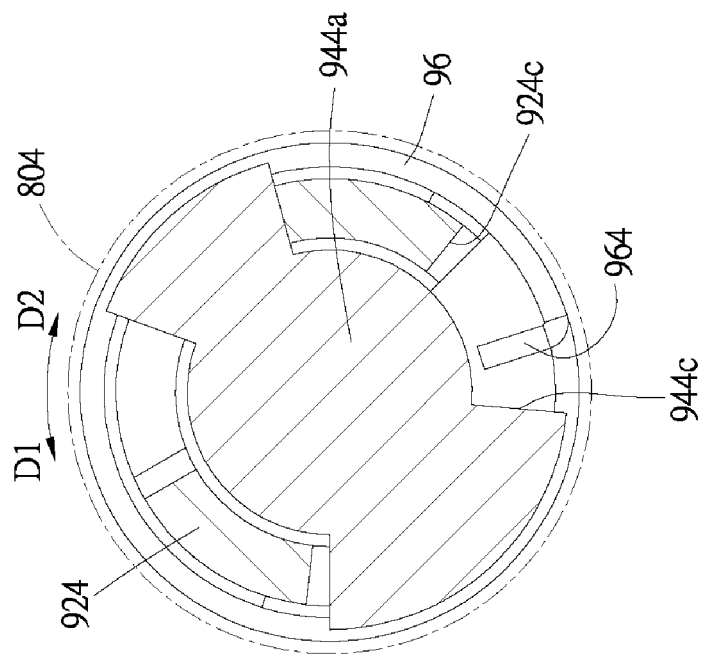
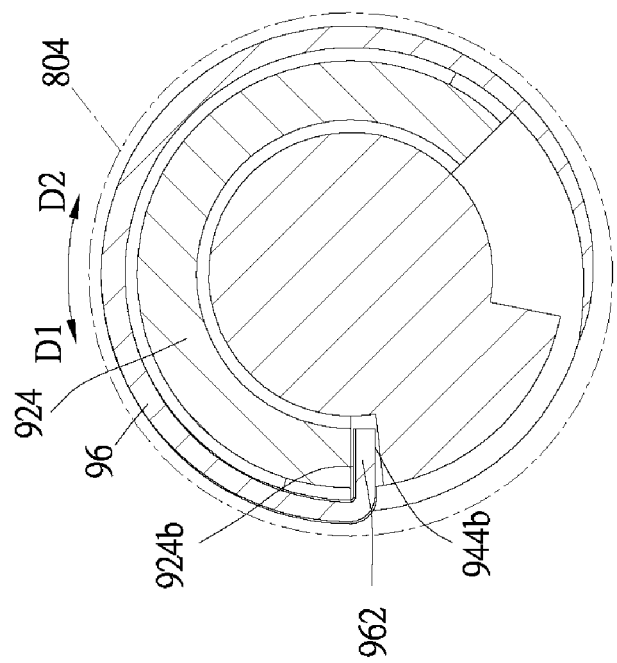
FIG. 22
FIG. 23

WINDOW COVERING AND DRIVING DEVICE THEREOF

BACKGROUND OF THE DISCLOSURE

1. Field of the Disclosure

The present disclosure generally relates to a window covering and a driving device thereof, and more particularly to a window covering having a covering material which can be driven to expand or collapse by a motor and a driving device thereof.

2. Description of the Prior Art

Window coverings are materials used to cover a window opening of a building to ensure privacy, insulate heat, block light, or provide other functions. A window covering known to the inventors includes a headrail, a covering material, a shaft located in the headrail, a decelerating device, and a motor, wherein the covering material is located below the headrail and is connected to the shaft, and a rotating shaft of the motor is connected to the shaft through the decelerating device. By controlling the motor to rotate its rotating shaft, the shaft can be driven to rotate by the force transferred through the decelerating device, whereby the shaft can move the covering material to make it collapse or expand.

The decelerating device of a window covering is usually an epicyclic gearing decelerating device, which includes a sun gear, a plurality of planet gears, and a ring gear. The sun gear is connected to the rotating shaft of the motor, and can be driven to rotate by the rotating shaft of the motor. The periphery of the sun gear meshes with the planet gears, and the ring gear is fixedly provided around the outer periphery of the planet gears, meshing with the planet gears. When the sun gear is moved to drive the planet gears to rotate, each planet gear rotates and revolves along the ring gear. While the planet gears are rotating and revolving, the teeth of the planet gears continuously mesh with the teeth of the ring gear and the sun gear along with the rotational movements. The surfaces of the teeth which are in a meshing state rub against each other, and the friction from such rubbing makes a pretty noticeable noise, which can be transmitted through the headrail and heard from outside. This kind of noise is particularly obvious when the planet gears are driven by high-speed rotations. Since window coverings are usually installed indoors, such noise generated during the lowering or raising of the covering material can be quite bothersome for the people in the nearby environment.

To avoid the above-mentioned drawback (i.e., epicyclic gearing decelerating devices making noise during operation), planet gears can be designed in a way that they are only allowed to rotate at low speed. With slow rotating planet gears, noise is reduced since friction caused by high-speed rotation between surfaces of teeth meshing with each other is no longer present. However, if it is required to make planet gears rotate at a slow pace, sun gears have to drive planet gears with a low rotation speed as well, and therefore the rotation speed of motors also has to be slow. For this reason, there would be only limited types of motors applicable. In addition, if the planet gears in an epicyclic gearing decelerating device rotate slower, the rotation speed outputted from the device would be lower, too. As a result, the moving speed of the rising and lowering of the covering material of a window covering will be slower as well. The covering material of window coverings known to the inventors has a moving speed around below 30 mm per second, which means, it takes around 20 seconds to fully expand or collapse a 600 mm long covering material. Therefore, a window covering with a long suspension length would require a long time to expand or collapse. If a user wants to adjust a window covering to a height between the top and bottom limits, it may take a certain waiting time before the window covering stays at the required position, which is inconvenient to use.

SUMMARY OF THE DISCLOSURE

The present disclosure provides a driving device of a window covering, wherein the window covering includes a covering material and a spindle for raising or lowering the covering material. The driving device includes a motor and an epicyclic gearing decelerating device. The motor has a shaft. The epicyclic gearing decelerating device has an input end and an output end, wherein the input end is connected to the shaft, and the output end is connected to the spindle. The epicyclic gearing decelerating device includes a first planet gear assembly, which is coupled to and located between the input end and the output end, and a first ring portion. The first planet gear assembly includes a plurality of first planet gears. The first ring portion is fixedly provided around the first planet gears, and the first planet gears are adapted to be driven by the input end to rotate along the first ring portion. Each of the first planet gears has a Shore A durometer hardness of 45 to 90.

The present disclosure further provides a window covering, which includes a housing, a covering material, a spindle, and a driving device. The spindle is provided at the housing, wherein the spindle is connected to the covering material, and is adapted to drive the covering material to expand or collapse. The driving device is provided at the housing, and includes a motor and an epicyclic gearing decelerating device. The motor has a shaft. The epicyclic gearing decelerating device has an input end and an output end, wherein the input end is connected to the shaft, and the output end is connected to the spindle. The epicyclic gearing decelerating device includes a first planet gear assembly, which is coupled to and located between the input end and the output end, and a first ring portion. The first planet gear assembly includes a plurality of first planet gears. The first ring portion is fixedly provided around the first planet gears, and the first planet gears are adapted to be driven by the input end to rotate along the first ring portion. Each of the first planet gears has a Shore A durometer hardness of 45 to 90.

The present disclosure also provides another window covering, which includes a housing, a covering material, a spindle, and a driving device. The covering material has a lower end. The spindle is provided at the housing, and is connected to the covering material. The driving device is provided at the housing, and includes a motor and an epicyclic gearing decelerating device. The motor has a shaft. The epicyclic gearing decelerating device has an input end and an output end, wherein the input end is connected to the shaft, and the output end is connected to the spindle. Through the epicyclic gearing decelerating device and the spindle, the shaft of the motor is able to drive the lower end of the covering material to move in directions approaching or away from the housing. A moving speed of the lower end of the covering material is above 65 mm per second.

With the first planet gears which have a Shore A durometer hardness of 45-90, the noise generated when the first planet gear moves along the first ring gear could be reduced, and therefore the noise heard while raising or lowering the covering material could be minimized. Since the disclosure mentioned above could reduce the noise, the speed of moving the lower end of the covering material could be increased to be above 65 mm per second, which could shorten the time required to expand or collapse the covering material.

These and other objectives of the present disclosure will no doubt become obvious to those of ordinary skill in the art after reading the following detailed description of the preferred embodiment that is illustrated in the various figures and drawings.

BRIEF DESCRIPTION OF THE DRAWINGS

The present disclosure will be best understood by referring to the following detailed description of some illustrative embodiments in conjunction with the accompanying drawings, in which:

FIG. 22 is a sectional view along the 22-22 line in FIG. 17;

FIG. 23 is a sectional view along the 23-23 line in FIG. 17;

DETAILED DESCRIPTION

Figure 1:
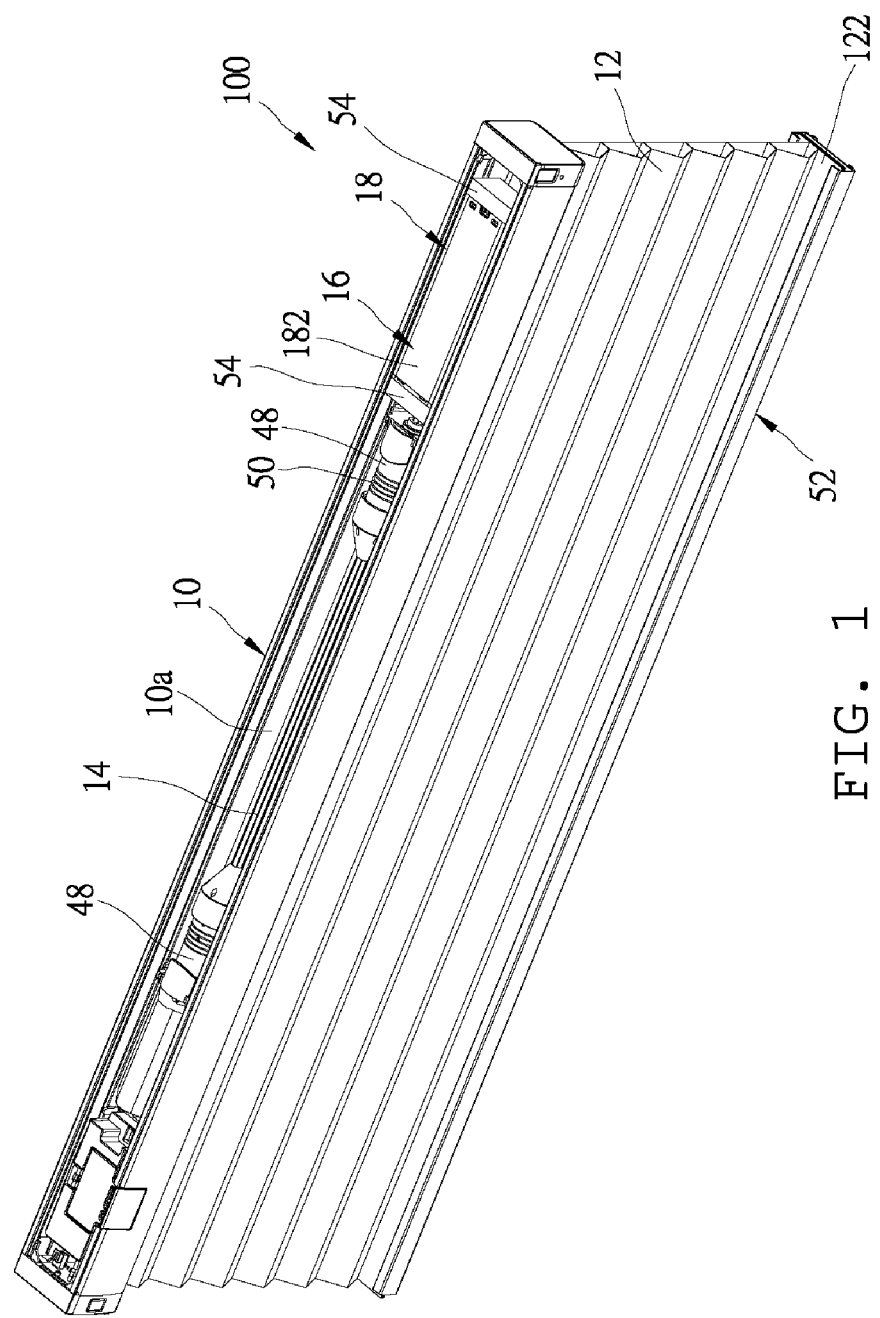
FIG. 1 is a perspective view of the window covering of a first embodiment.
Figure 2:
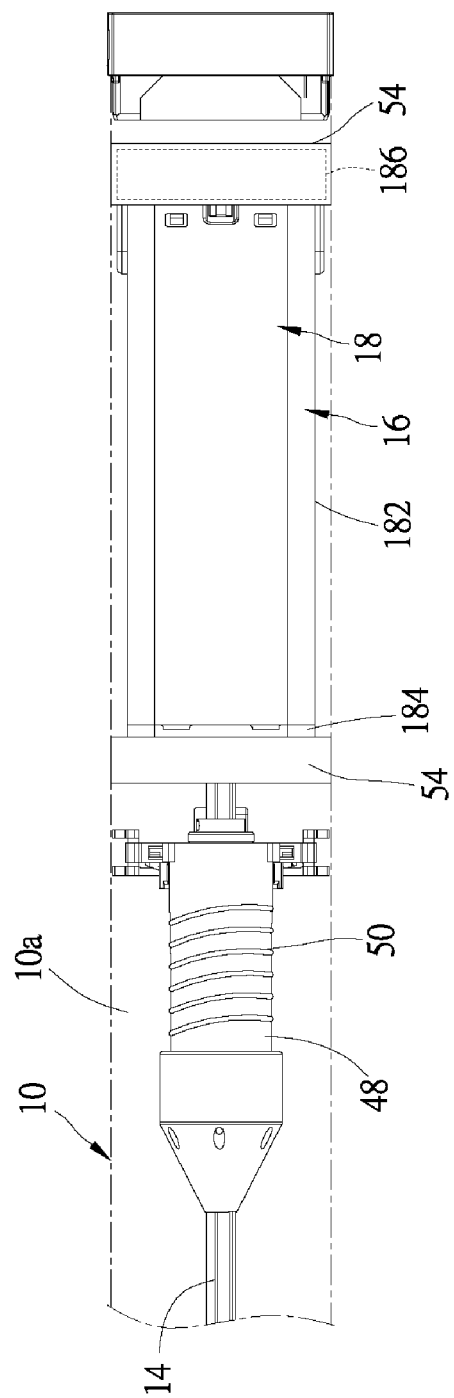
FIG. 2 is a top view showing the interior of the housing of the first embodiment.
Figure 3:
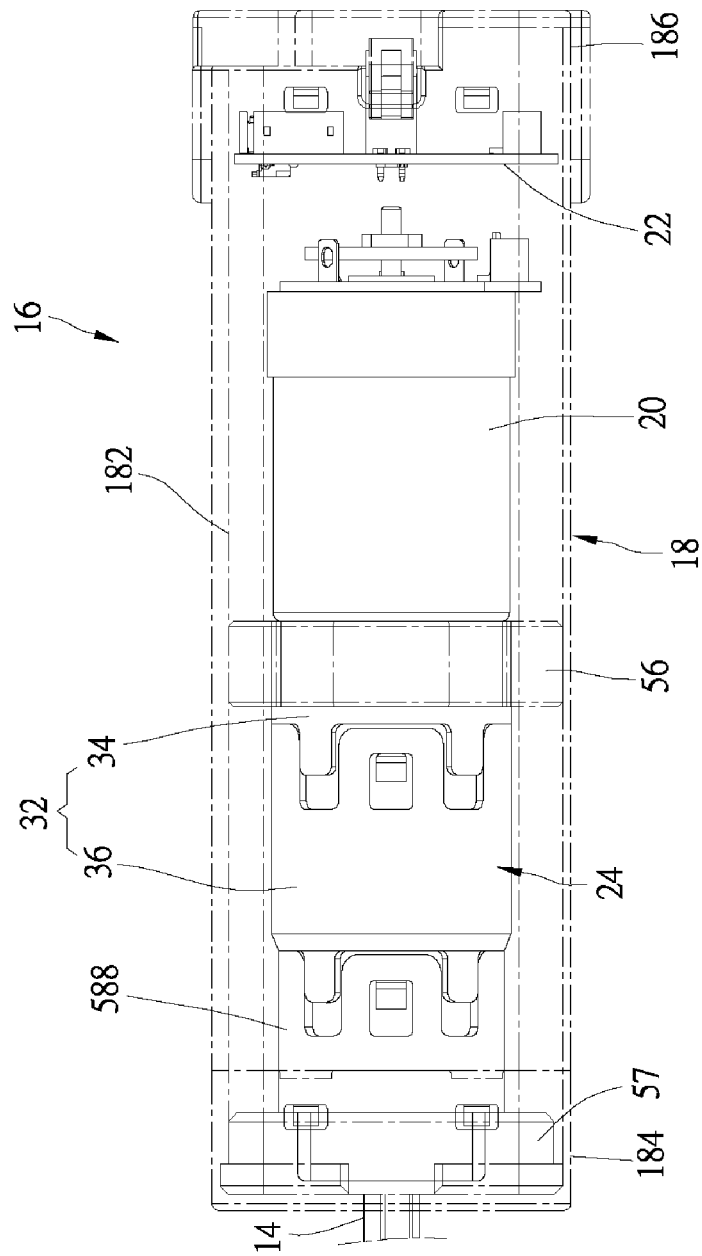
FIG. 3 is a top view showing the driving device of the first embodiment.
Figure 4:
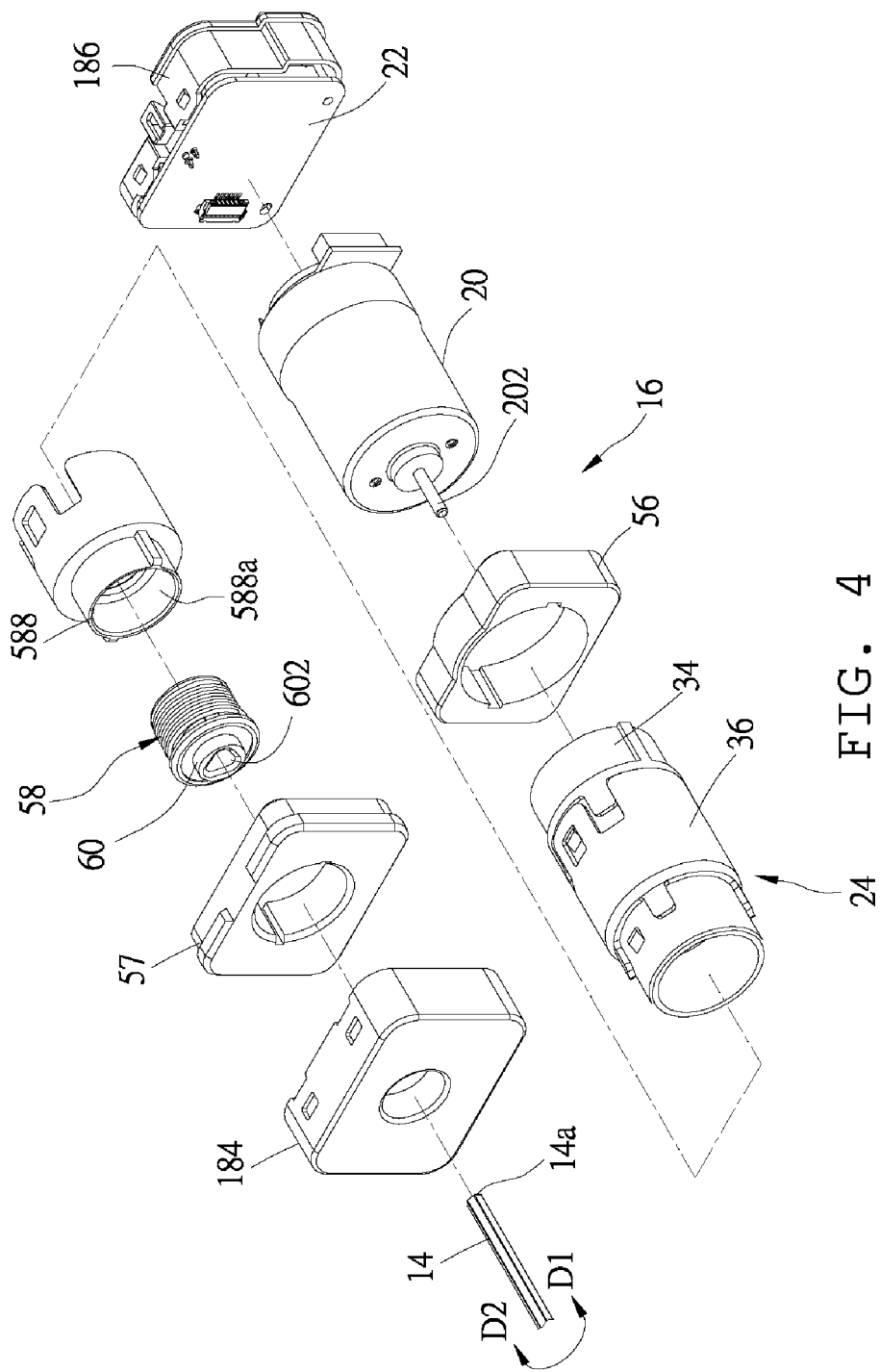
FIG. 4 is an exploded view of the driving device of the first embodiment, with the case omitted.
Figure 5:
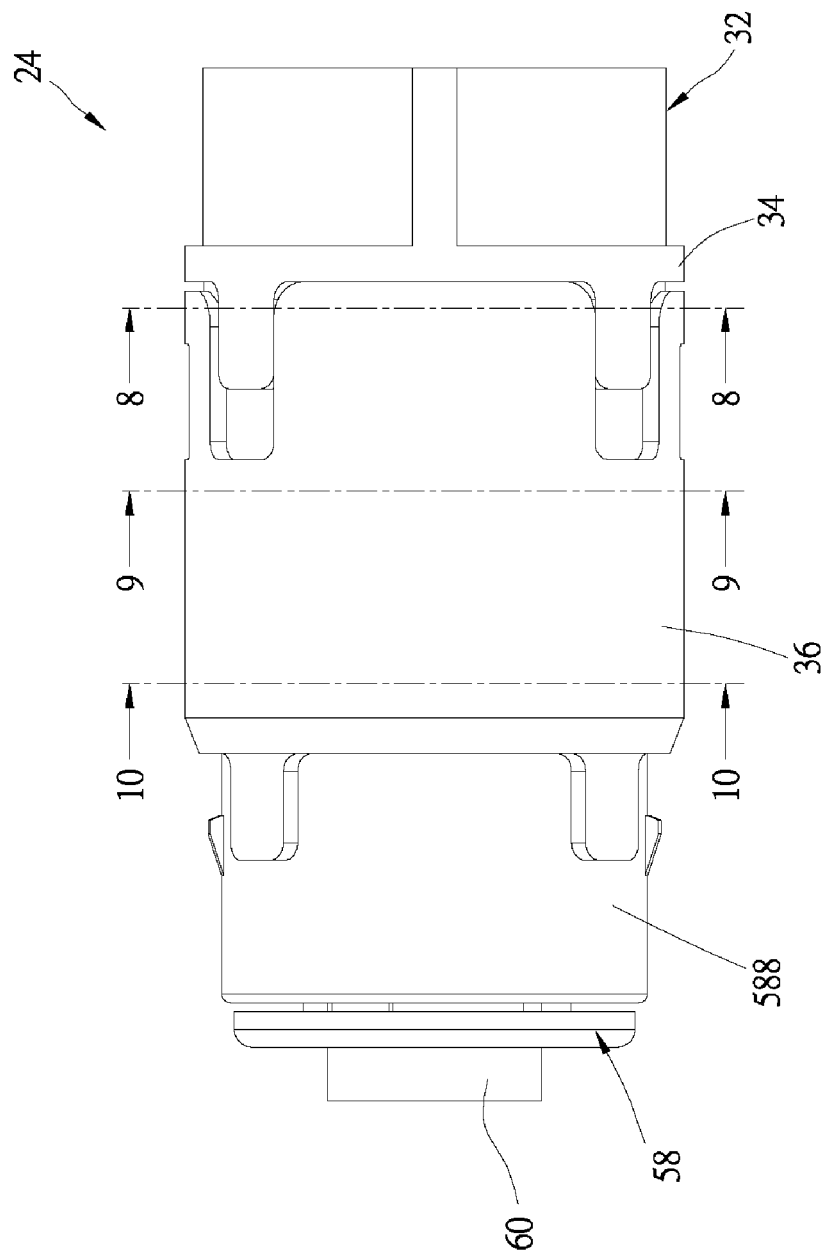
FIG. 5 is a side view of the epicyclic gearing decelerating device of the first embodiment.
Figure 6:
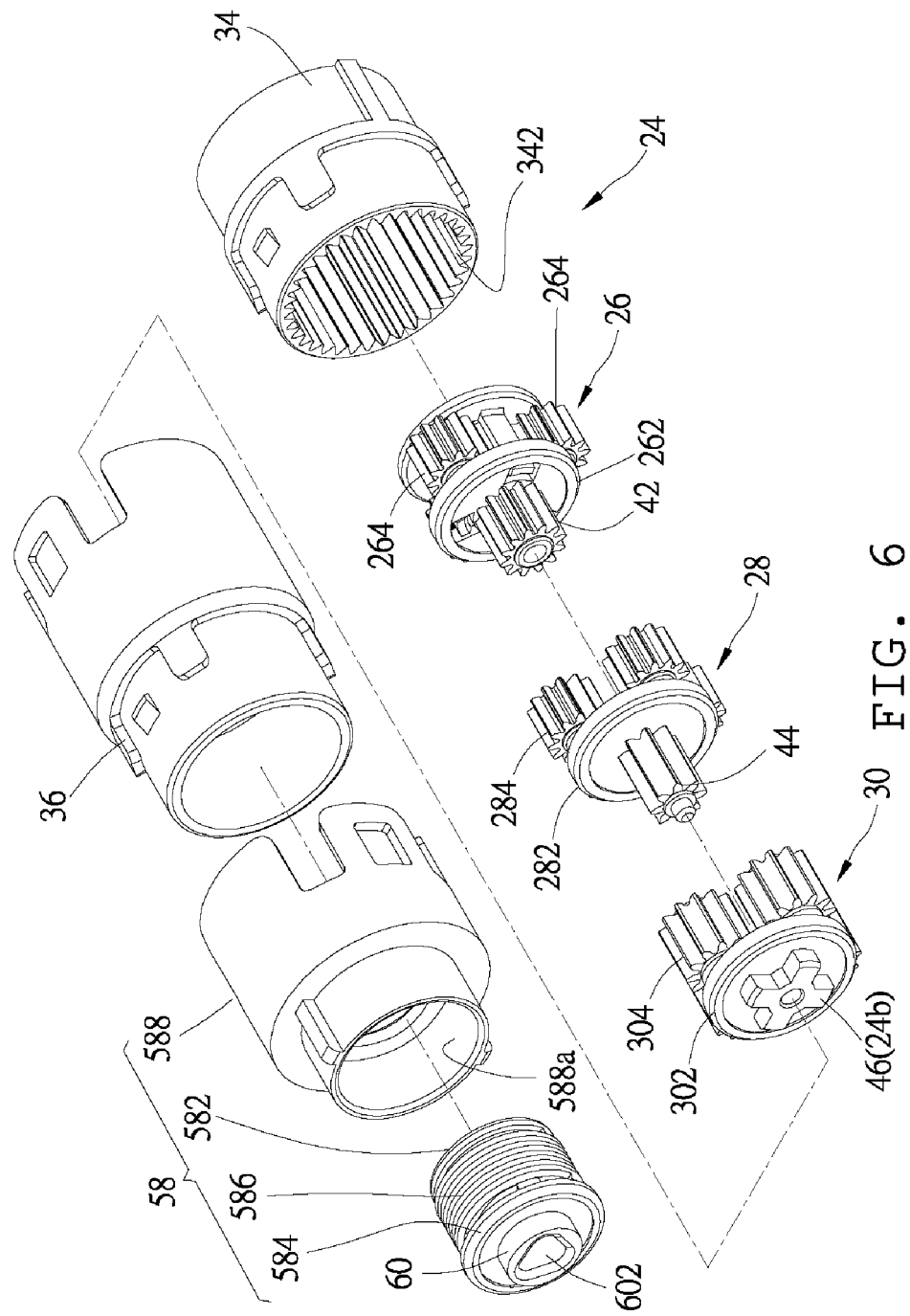
FIG. 6 is an exploded view of the epicyclic gearing decelerating device of the first embodiment.
Figure 7:
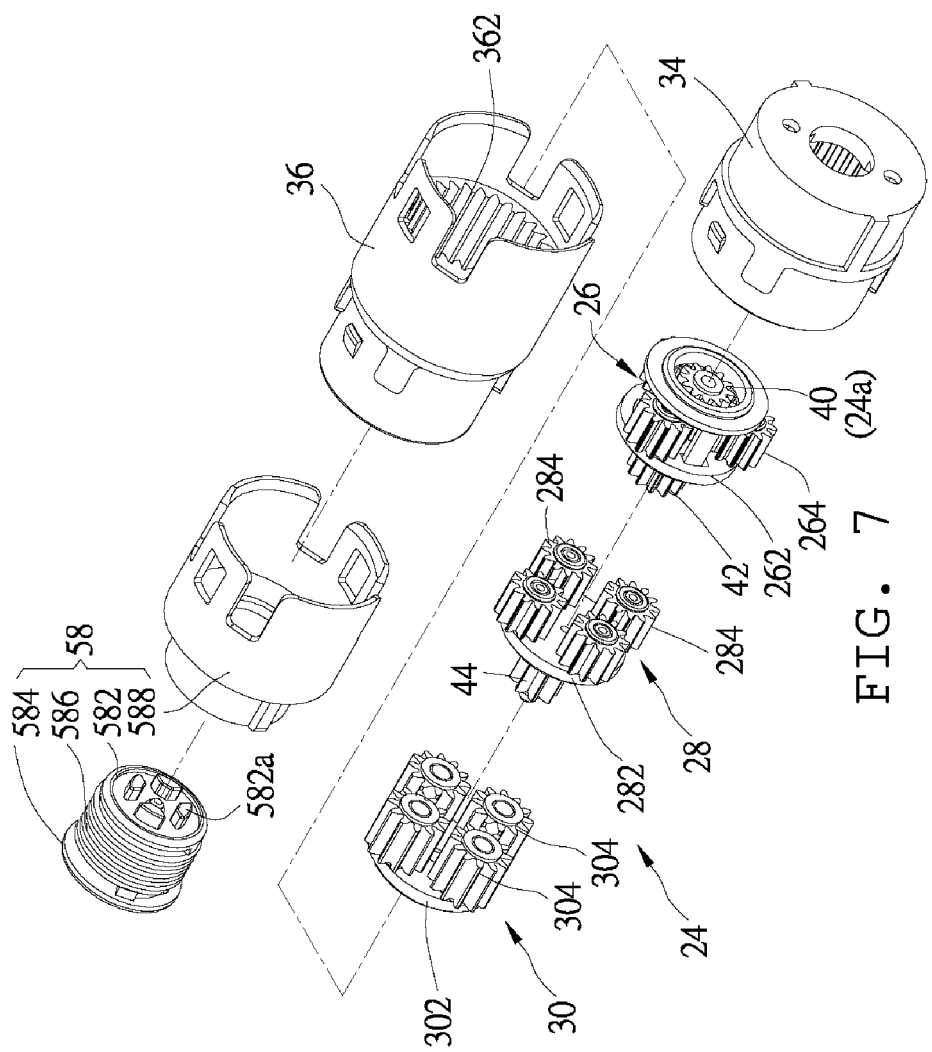
FIG. 7 is another exploded view of the epicyclic gearing decelerating device of the first embodiment seen from a different angle.
Figure 8:
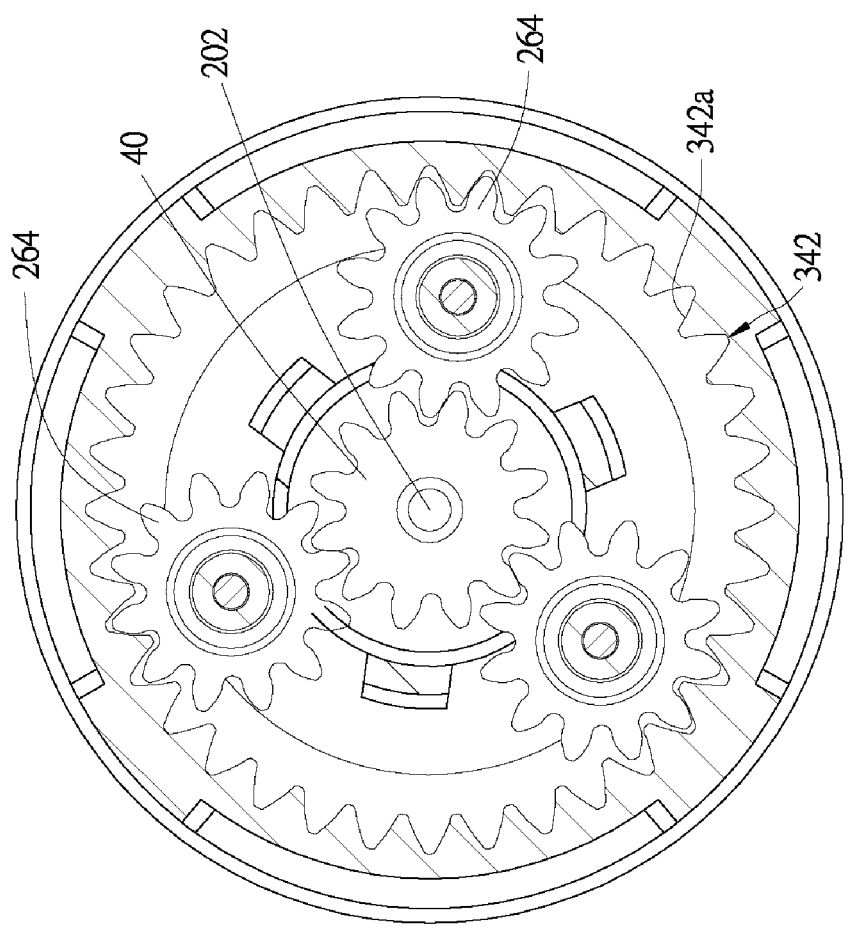
FIG. 8 is a sectional view along the 8-8 line in FIG. 5.
Figure 9:
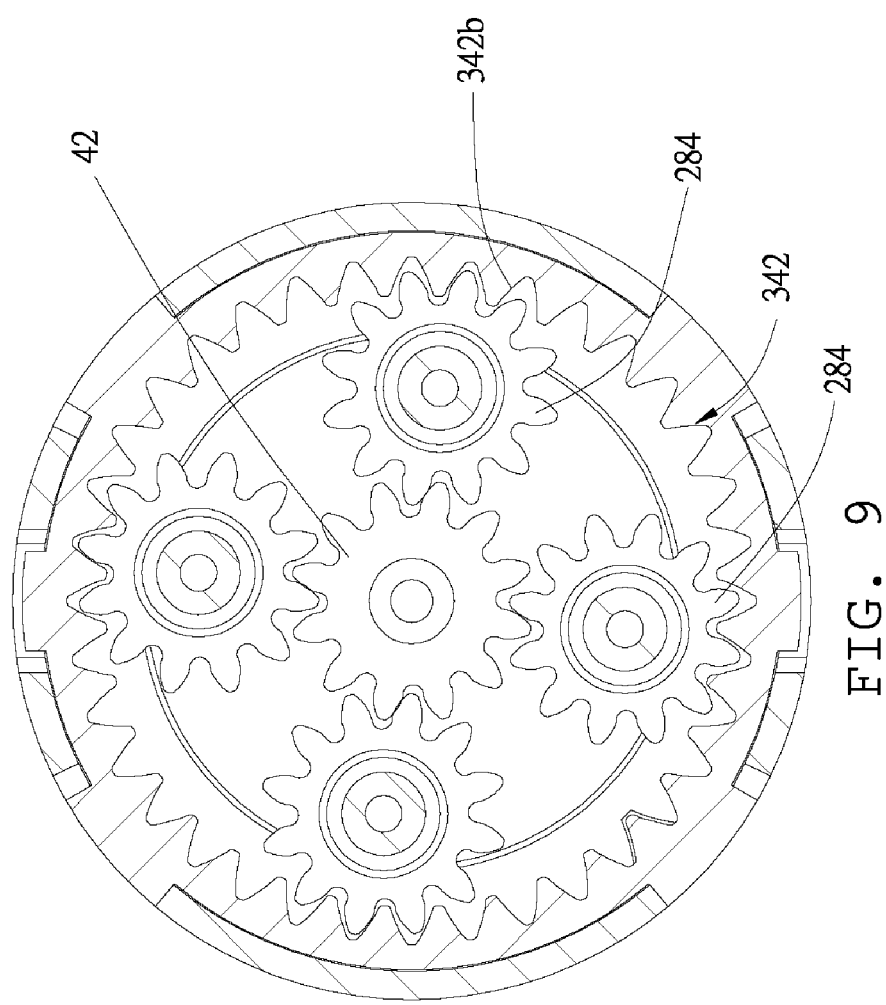
FIG. 9 is a sectional view along the 9-9 line in FIG. 5.
Figure 10:
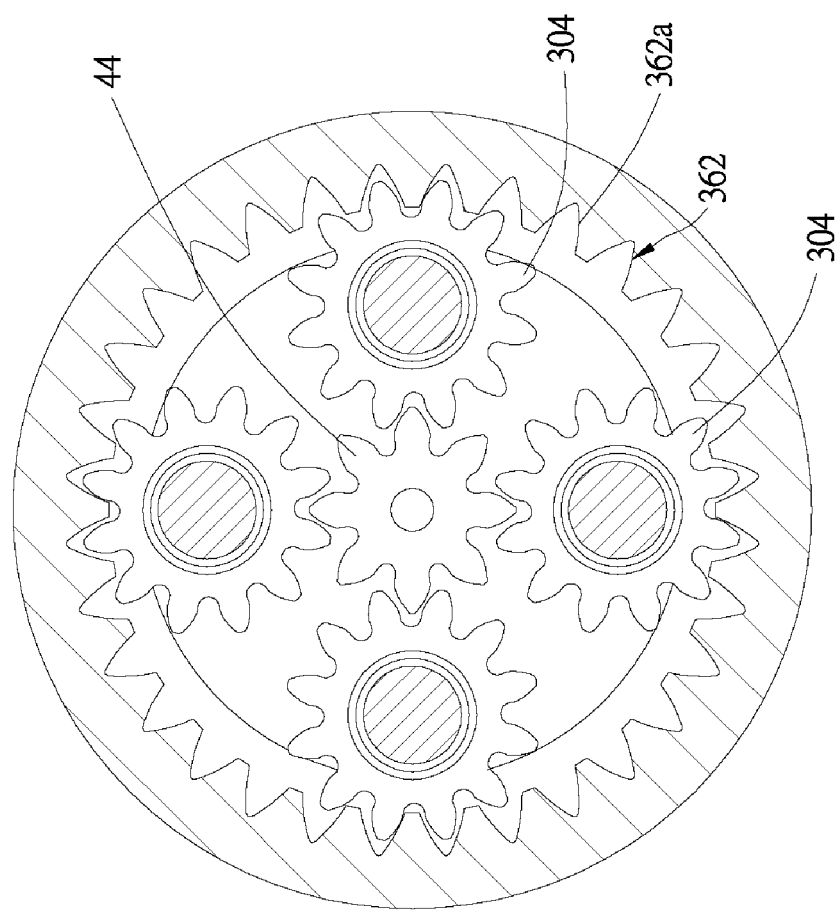
FIG. 10 is a sectional view along the 10-10 line in FIG. 5.
Figure 11:
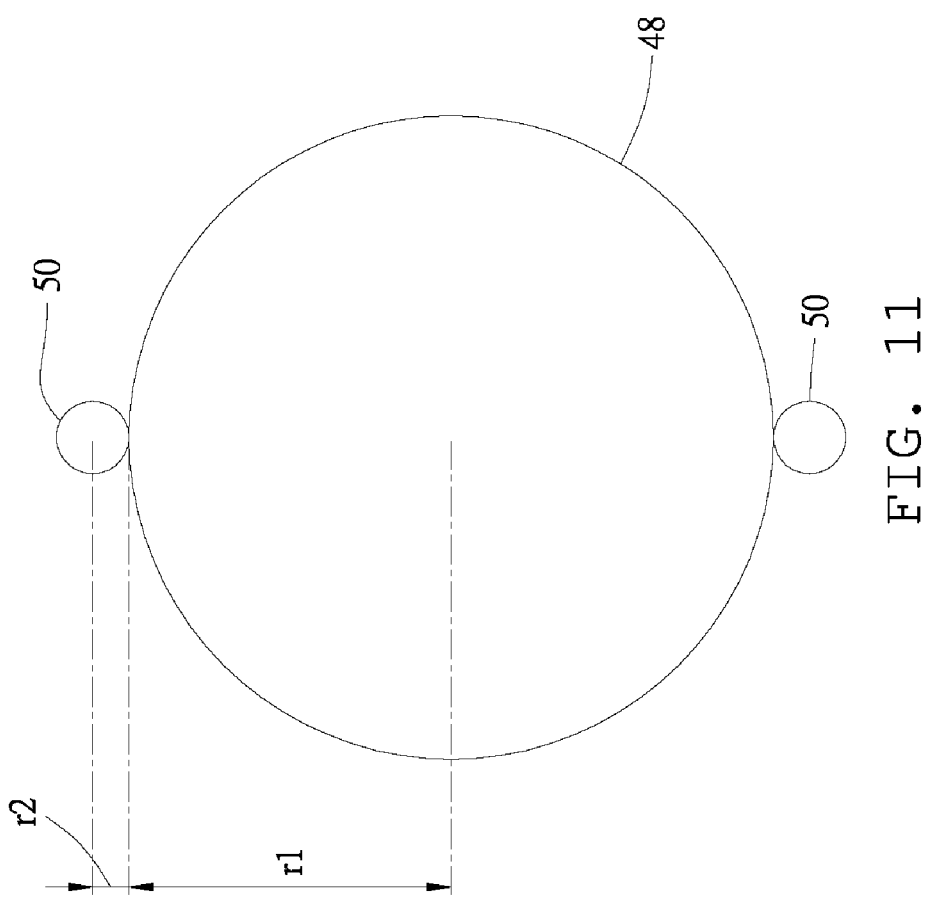
FIG. 11 is a schematic view of the spool and the cord of the first embodiment.

A window covering 100 of a first embodiment of the present disclosure is shown in FIG. 1 to FIG. 11, which includes a housing 10, a covering material 12, a spindle 14, and a driving device 16, wherein:

The housing 10 is a frame having a receiving space 10*a* therein. The covering material 12 is located below the housing 10, and the covering material 12 has a lower end 122 movable relative to the housing.

The spindle 14 and the driving device 16 are provided in the receiving space 10*a* of the housing 10. In some embodiments, the spindle 14 has a polygonal or round cross-sectional outline. The spindle 14 extends in a longitudinal direction of the housing 10, wherein the driving device 16 is connected to an end of the spindle 14, and can be used to drive the spindle 14 to rotate.

In the current embodiment, two rotatable spools 48 fit around the spindle 14, and are spaced apart from each other. Each of the spools 48 is respectively wound around by a cord 50. Each of the cords 50 passes through a bottom of the housing 10 and part of the covering material to have an end thereof fixed to the lower end 122 of the covering material 12. The lower end 122 of the covering material 12 is provided with a bottom rail 52. The cords 50 pass through the covering material 12, and can be fixed to the bottom rail 52.

The driving device 16 includes an outer casing 18, wherein a motor 20 and an epicyclic gearing decelerating device 24 are located in the outer casing 18. At least one cushion member fits around the outer casing 18. In the current embodiment, the at least one cushion member includes two first cushion members 54 respectively fixed at two ends of the outer casing 18. Each of the first cushion members 54, located therebetween, abuts against the outer casing 18 and the housing 10 at the same time, so that the outer casing 18 can be fixedly provided on the housing 10. In some embodiments, each of the first cushion members 54 is made of rubber, silicone, polyurethane, or other materials with a vibration-damping effect. The outer casing 18 includes a case 182, a front cover 184, and a rear cover 186. The motor 20 and the epicyclic gearing decelerating device 24 are located in the case 182. The front cover 184 and the rear cover 186 are provided at two ends of the case 182, wherein the first cushion members 54 respectively fit around the front cover 184 and the rear cover 186. A control circuit board 22 of the motor 20 is located between the rear cover 186 and the motor 20.

A second cushion member 56 is provided between the epicyclic gearing decelerating device 24 and the outer casing 18, wherein the second cushion member 56 is located between the epicyclic gearing decelerating device 24 and the case 182, and abuts against the epicyclic gearing decelerating device 24 and an inner wall of the case 182 at the same time. The second cushion member 56 is made of rubber, silicone, polyurethane, or other materials which also have a shock absorbing effect.

As shown in FIG. 4 to FIG. 10, the motor 20 has a shaft 202, and the epicyclic gearing decelerating device 24 has an input end 24*a* and an output end 24*b*, wherein the input end 24a is connected to the shaft 202, and the output end 24b is connected to the spindle 14. In the current embodiment, a first sun gear 40 forms the input end 24a, wherein the first sun gear 40 is connected to the shaft 202, and can be rotated by the moving of the shaft 202. The epicyclic gearing decelerating device 24 includes a planet gear assembly, which has at least one stage, and couples the input end 24a and the output end 24b. In the current embodiment, the epicyclic gearing decelerating device 24 includes, sequentially arranged between the input end 24a and the output end 24b, a first planet gear assembly 26, a second planet gear assembly 28, and a third planet gear assembly 30. However, this is not a limitation of the present disclosure; a two- or more-than-four-stage planet gear assembly would also be feasible.

In more detail, the epicyclic gearing decelerating device 24 includes an inner casing 32, which is fixedly provided in the case 182. The inner casing 32 includes a first case 34 and a second case 36. Similarly, the first case 34 and the second case 36 are also fixedly provided in the case 182. The first case 34 has a first ring gear 342 provided on an inner wall surface thereof, wherein the first ring gear 342 has a first ring portion 342a and a second ring portion 342b. The first planet gear assembly 26 and the second planet gear assembly 28 are located in the first case 34.

The first planet gear assembly 26 includes a first support 262 and a plurality of first planet gears 264 rotatably provided on the first support 262. The first planet gears 264 mesh with the first sun gear 40, and mesh with the first ring portion 342a fixedly provided around the first planet gears 264. The first planet gears 264 can be driven by the first sun gear 40 to rotate and revolve along the first ring portion 342a, so that the first support 262 is rotatable by the rotation and revolution of the first planet gears 264. A second sun gear 42 is provided at an end of the first support 262.

The first case 34 can be made of metal. Each of the first planet gears 264 can be made of materials with a damping effect, i.e., materials with a Shore A durometer hardness below 90. In some embodiments, a range of the hardness is between 45 and 90. As a result, while each of the first planet gears 264 is rotating along the first ring portion 342a, the noise generated by the meshing operation between these components could be reduced. In other embodiments, each of the first planet gears 264 can be made of a thermoplastic elastomer (TPE), such as thermoplastic rubber (TPR), thermoplastic vulcanizate (TPV), thermoplastic polyurethanes (TPU), and thermoplastic polyether ester elastomer (TPEE). These materials are flexible as rubber and strong as engineering plastics at the same time. Since the first planet gear assembly 26 is closest to the input end, thereby allowing the first planet gears 264 to rotate at the highest speed, the first planet gears 264 having a Shore A durometer hardness of 45 to 90 could effectively reduce the noise generated by high-speed meshing operations. Furthermore, the engineering strength required for rotating as they are meshing with the first ring portion 342a would still be ensured.

The second planet gear assembly 28 includes a second support 282 and a plurality of second planet gears 284 rotatably provided on the second support 282. The second planet gears 284 mesh with the second ring portion 342b fixedly provided around the second planet gears 284, and are coupled to the first planet gear assembly 26 through the second sun gear 42. The first planet gear assembly 26 concurrently drives the second sun gear 42 to rotate, which makes the second sun gear 42 drive the second planet gears 284 to rotate and revolve along the second ring portion 342b. The second support 282 can be rotated as it is being driven by the rotation and revolution of the second planet gears 284. A third sun gear 44 is provided at an end of the second support 282. In the current embodiment, each of the second planet gears 284 can be made of the same material as the first planet gears 264, and therefore could also provide the effect of reducing the noise generated by the meshing operations.

The second case 36 matches the first case 34, and has a second ring gear 362 on an inner wall surface thereof. The second ring gear 362 has a third ring portion 362a. The third planet gear assembly 30 is located in the second case 36. The third planet gear assembly 30 includes a third support 302 and a plurality of third planet gears 304 rotatably provided on the third support 302. The third planet gears 304 mesh with the third ring portion 362a fixedly provided around the third planet gears 304, and are coupled to the second planet gear assembly 28 through the third sun gear 44. The second planet gear assembly 28 concurrently moves the third sun gear 44 to rotate, which makes the third sun gear 44 drive the third planet gears 304 to rotate and revolve along the third ring portion 362a. The third support 302 can be rotated as it is being driven by the rotation and revolution of the third planet gears 304.

The second case 36 can be made of metal. In the current embodiment, the third planet gear assembly 30 is closer to the output end 24b than the first and second planet gear assemblies 26, 28 are, and therefore bears the highest torque. In light of this, the module of each of the third planet gears 304 can be greater than the module of each of the first and second planet gears 264, 284, so that each of the third planet gears 304 could withstand more stress, and could, therefore, be prevented from being damaged by high torque.

The third support 302 has a protruding portion 46 provided at an end thereof away from the third planet gears 304. The protruding portion 46 is in a shape of a cruciform, and forms the output end 24b. The protruding portion 46 is connected to the spindle 14 through a spring brake 58. The spring brake 58 includes an input portion 582, an output portion 584, a spring 586, and a braking case 588, wherein the braking case 588 is fixedly provided in the case 182, and is connected to the second case 36. The input portion 582, the output portion 584, and the spring 586 are provided in the braking case 588. The input portion 582 has a plurality of protrusions 582a provided thereon, and the protruding portion 46 provided on the third support 302 can correspondingly fit into the space between the protrusions 582a, whereby the input portion 582 is coupled to the third support 302 of third planet gear assembly 30.

The driving device 16 further includes a sleeve 60, which is disposed at the output portion 584 of the spring brake 58, wherein the sleeve 60 has an axial hole 602, which allows an end portion 14a of the spindle 14 to get into. The axial hole 602 is polygonal, and the end portion 14a of the spindle 14 abuts against a wall of the axial hole 602 to establish a fixed connection. The spring 586, the input portion 582, and the output portion 584 are coaxial, and sequentially fit around one another from outside to inside. The spring 586 is provided at a location corresponding to an inner circular wall 588a of the braking case 588, and contacts the inner circular wall 588a. Two ends of the spring 586 can be pushed by the input portion 582 or the output portion 584 to move, and therefore, by utilizing the winding direction of the spring 586, the radial direction of the spring 586 can be changed. The input portion 582 can be driven to rotate by the third planet gear assembly 30, and when the input portion 582 rotates, it pushes one of the ends of the spring 586 to move, which shrinks the spring 586 in the radial direction thereof, making the spring 586 no longer contact the inner circular wall 588a of the braking case 588. As a result, the spring 586 can be pushed by the input portion 582 to rotate, and then push against the output portion 58, which forces the output portion 58 to rotate in a first rotation direction D1 or a second rotation direction D2 opposite to the first rotation direction D1, whereby the spindle 14 can be driven to rotate in the first rotation direction D1 or the second rotation direction D2. When the spindle 14 rotates in the first rotation direction D1, the covering material 12 is being expanded; when the spindle 14 rotates in the second rotation direction D2, the covering material 12 is being collapsed. To make the covering material 12 stay at a predetermined position, the motor 20 stops driving the epicyclic gearing decelerating device 24 and the input portion 582 of the spring brake 58 to rotate. At this time, the spindle 14 would have a tendency to rotate in the first rotation direction D1, which is the direction to lower the covering material 12, due to the weight of the covering material 12. Consequently, the output portion 584 would be driven by the spindle 14 to rotate in the first rotation direction D1 as well. When the output portion 584 pushes against the other end of the spring 586, the spring 586 will expand in the radial direction, abutting against the inner circular wall 588a of the braking case 588, whereby to stop the rotation. As a result, the spindle 14, the output portion 584, and the third planet gear assembly 30 could be concurrently stopped as the spring 586 brakes, so that the spindle 14 could create a braking effect, and the lower end 122 of the covering material 12 could therefore stay at the predetermined location.

In the current embodiment, the second cushion member 56 fixedly fits around the first case 34 and abuts against an inner side of the case 182, whereby to secure the position of the first case 34 in the case 182. In addition, a third cushion member 57 can be further provided between the front cover 184 and the braking case 588, wherein the third cushion member 57 fixedly fits around the braking case 588 and abuts against an inner side of the front cover 184. The third cushion member 57 is made of rubber, silicone, polyurethane, or other equivalent materials that have a vibration damping effect.

With the structures mentioned above and by selecting materials having a Shore A durometer hardness of 45 to 90 to make the first and second planet gears 264, 284, the noise, which is generated due to the friction between the meshing gear teeth while the shaft 202 of the motor 20 is rotating, could be effectively reduced. With the second cushion member 56 located between (and abutting against) the epicyclic gearing decelerating device 24 and the inner side of the outer casing 18, a shock-absorbing effect could be further provided, and therefore the vibration transmitted to the outer casing 18 from the motor 20 and the epicyclic gearing decelerating device 24 could be reduced, whereby the components and structures would be prevented from making noise due to too much vibration. The third cushion member 57 is located at an outer periphery of the sleeve 60, and could also absorb shocks and reduce noise. The first cushion member 54, which abuts against the outer casing 18 and the housing 10 and is located therebetween, not only fixes the driving device 16 through the connection established between itself, the outer casing 18 and housing 10, but also provides a vibration-damping effect by the property of its material, which could eliminate the vibration coming from the outer casing 18, and could, therefore, reduce the noise made by the vibration of each component and structure. With such design, every part of the driving device 16 from inside to outside could all provide a noise-reducing effect.

The shaft 202 of the motor 20 of the driving device 16 drives the covering material 12 to expand or to collapse through the epicyclic gearing decelerating device 24 and the spindle 14. With the vibration-reducing and noise-lowering design mentioned above, the lower end 122 of the covering material 12 of the window covering 100 of the present disclosure could be moved at a speed higher than 65 mm per second, leading to a fast-moving and quiet window covering 100.

The moving speed (i.e., the linear speed) of the lower end 122 of the covering material 12 follows the formula below:

$$V=(r\times((\text{rpm}/60)\times2\pi))/G$$

where V is the linear speed, r is the sum of a radius r1 of the spool 48 and a radius r2 of a reeled member, which is the cord 50 for example (referring to FIG. 11), rpm is the number of revolutions per minute of the shaft 202 of the motor 20, and G is an overall reduction ratio of the epicyclic gearing decelerating device 24.

In the current embodiment, r1=11.25 mm, r2=0.5 mm, r=11.75 mm, and G=80; Table 1 below shows the linear speed corresponding to different revolutions of the shaft 202 of the motor 20.

TABLE 1

| Rpm (rev/min) | V(mm/sec) |
| --- | --- |
| 2100 | 32.3 |
| 4000 | 61.52 |
| 4226 | 65 |
| 6000 | 92.29 |
| 7500 | 115.4 |
| 10000 | 153.8 |
| 12000 | 184.6 |

It can be seen from Table 1 that, if the rpm of the shaft 202 of the motor 20 goes above 4226, the moving speed of the lower end 122 of the covering material 12 will be higher than 65 mm per second. In practice, in order to reach a moving speed higher than 65 mm per second, the radius of the spool 48, the radius of the cord 50, the overall reduction ratio of the epicyclic gearing decelerating device 24, and the revolutions per minute of the shaft 202 of the motor 20 can all be adjusted subject to the components in use, and are not limited by the values exemplified above. For example, the overall reduction ratio of the epicyclic gearing decelerating device 24 could be 64; in such a circumstance, if the rpm of the motor 20 exceeds 3383, the moving speed of the lower end 122 of the covering material 12 can reach 65 mm or above per second.

According to the above description, by using the first and second planet gears 264, 284 having a Shore A durometer hardness of 45-90, the present disclosure could effectively reduce the noise generated during the revolutions of the first planet gear 264 and the second planet gear 284 along the first ring portion 342a and the second ring portion 342b. As a result, the noise created while expanding or collapsing the covering material 12 would be reduced. Furthermore, through the design mentioned above that could reduce the noise caused due to the operation of the covering material 12 driven by the driving device 16, the moving speed of the lower end 202 of the covering material 12 could reach 65 mm per second and above, which could effectively reduce the time required to expand or collapse the covering material 12.

Figure 12:
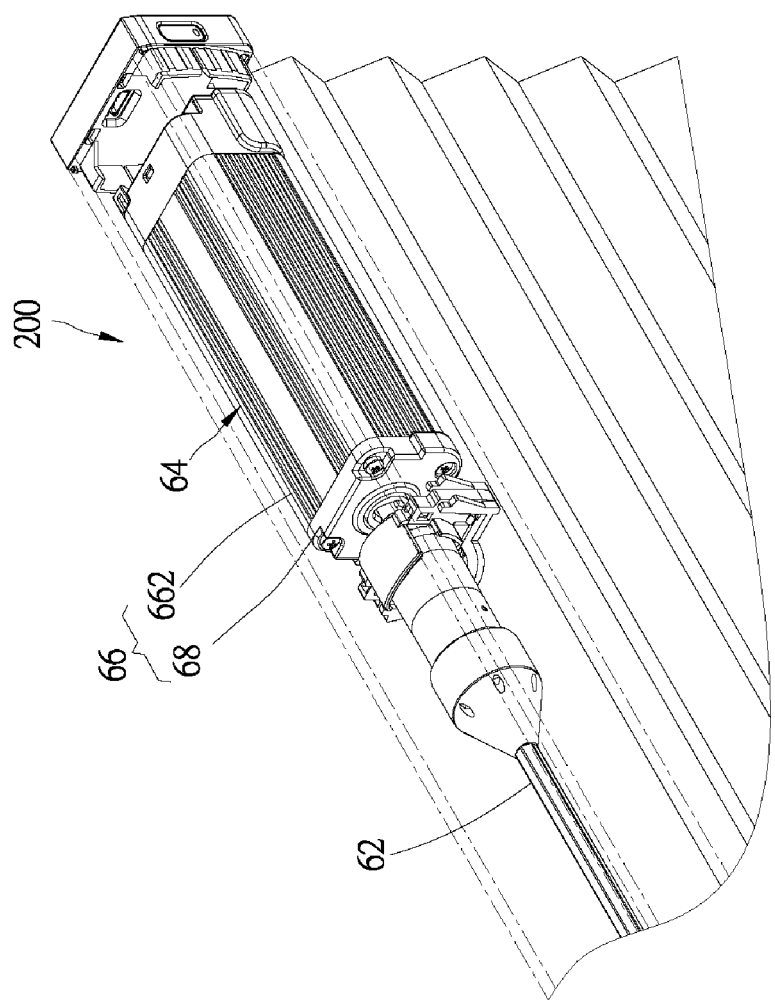
FIG. 12 is a partial perspective view of the window covering of a second embodiment, with the cord omitted.
Figure 13:
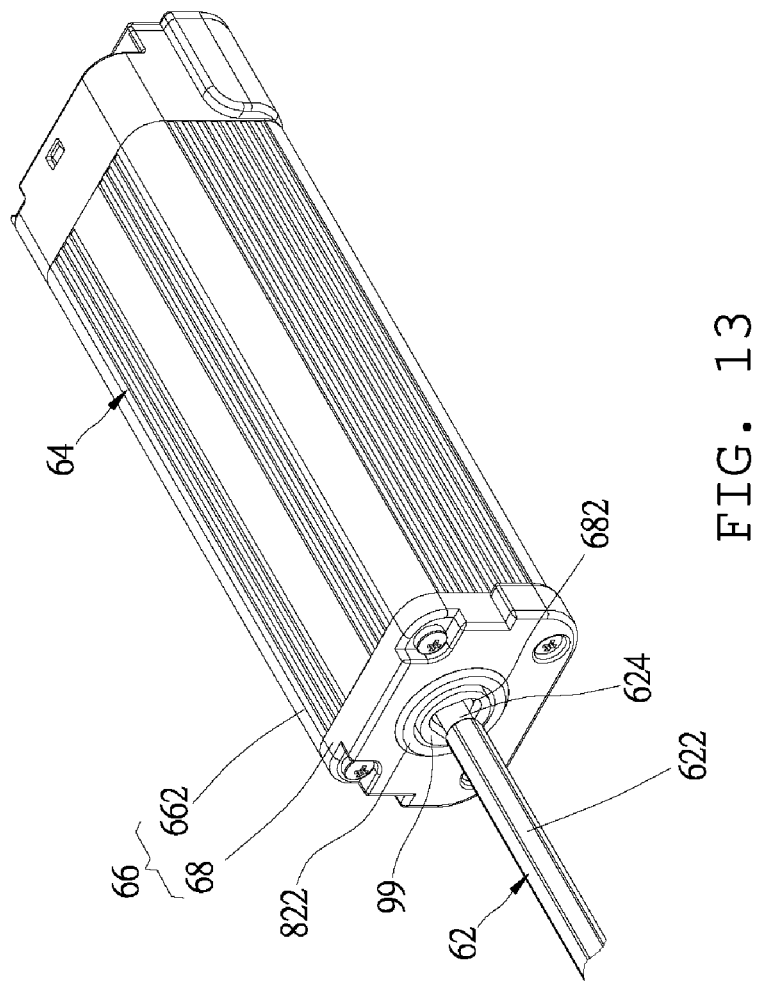
FIG. 13 is a perspective view of the driving device of the second embodiment.
Figure 14:
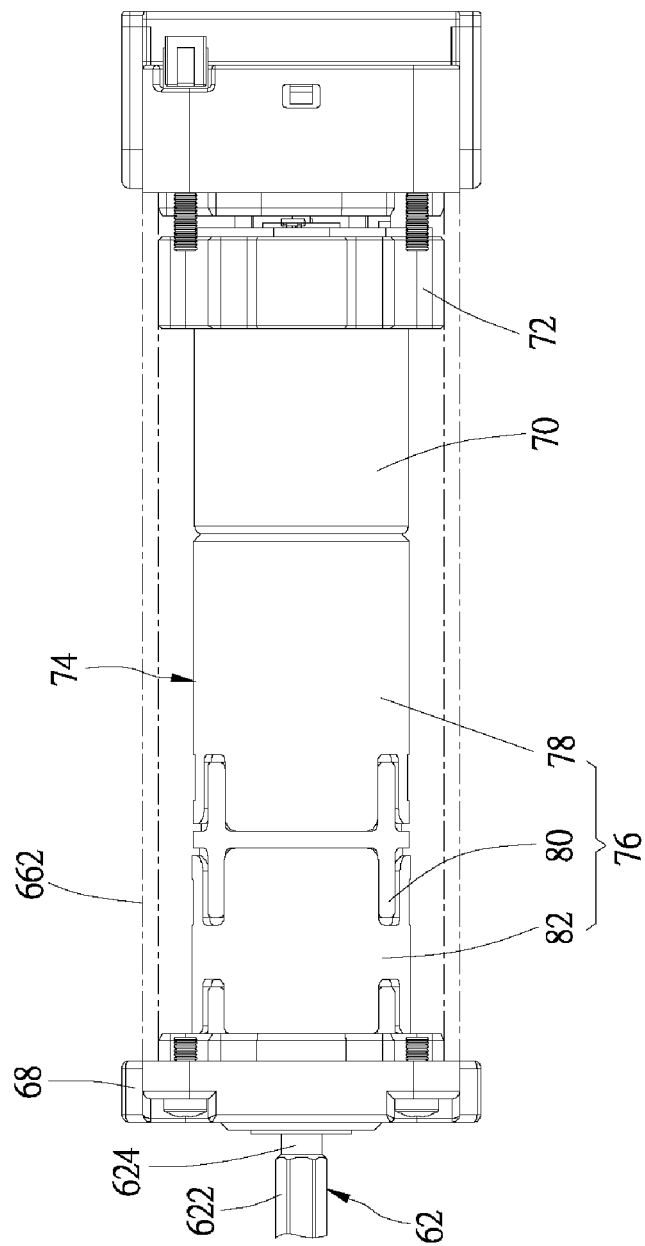
FIG. 14 is a top view of the driving device of the second embodiment.
Figure 15:
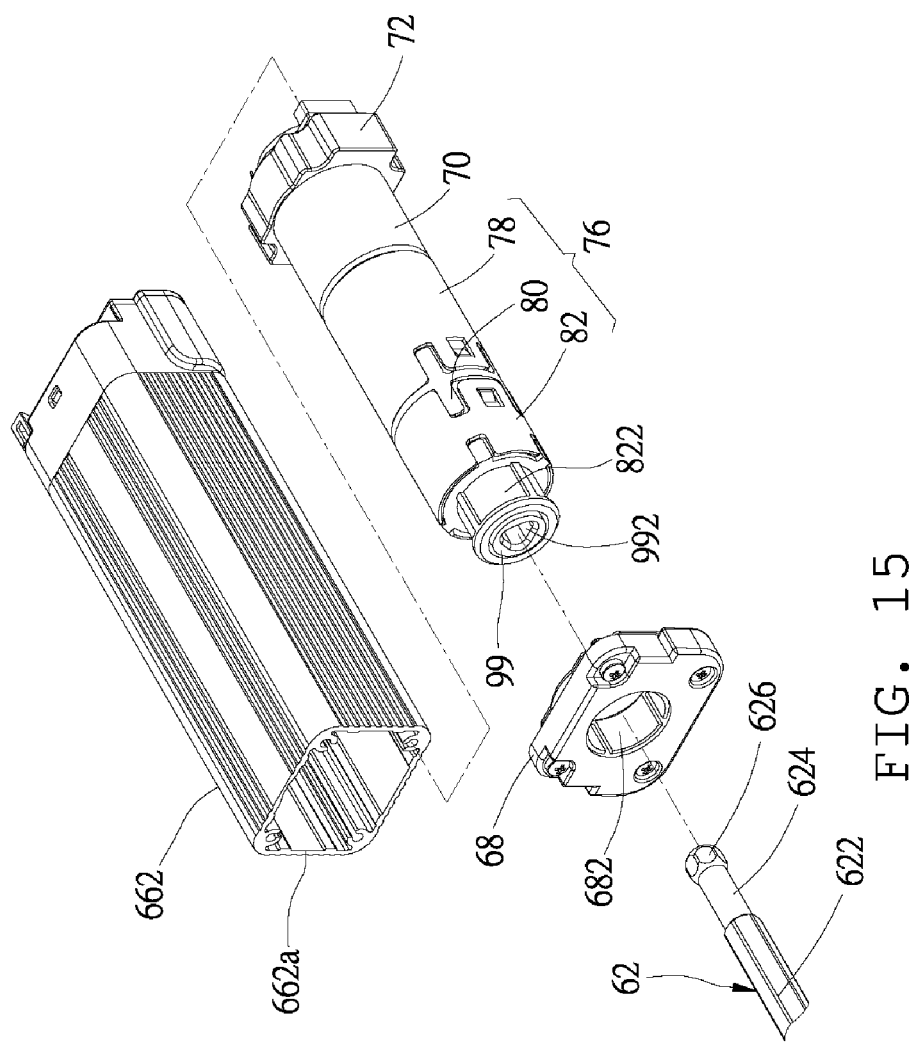
FIG. 15 is an exploded view of the driving device of the second embodiment.
Figure 16:
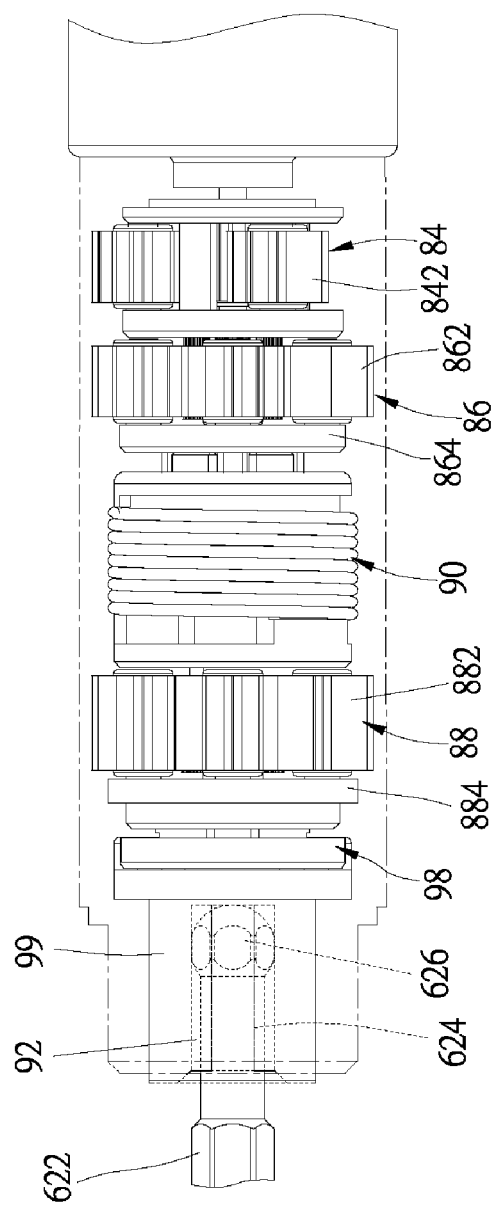
FIG. 16 is a top view of the epicyclic gearing decelerating device of the second embodiment.
Figure 17:
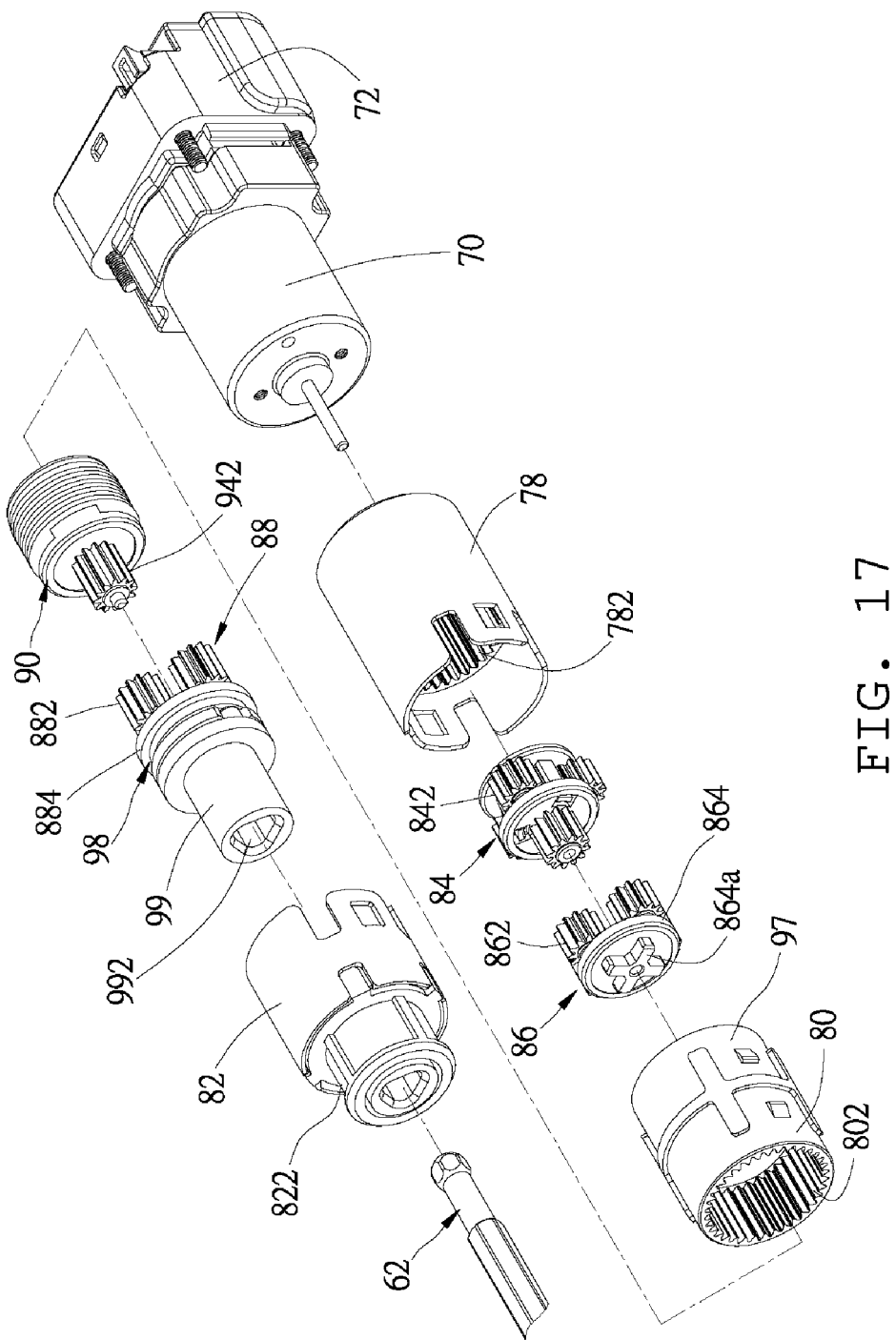
FIG. 17 is an exploded view of the epicyclic gearing decelerating device of the second embodiment.
Figure 18:
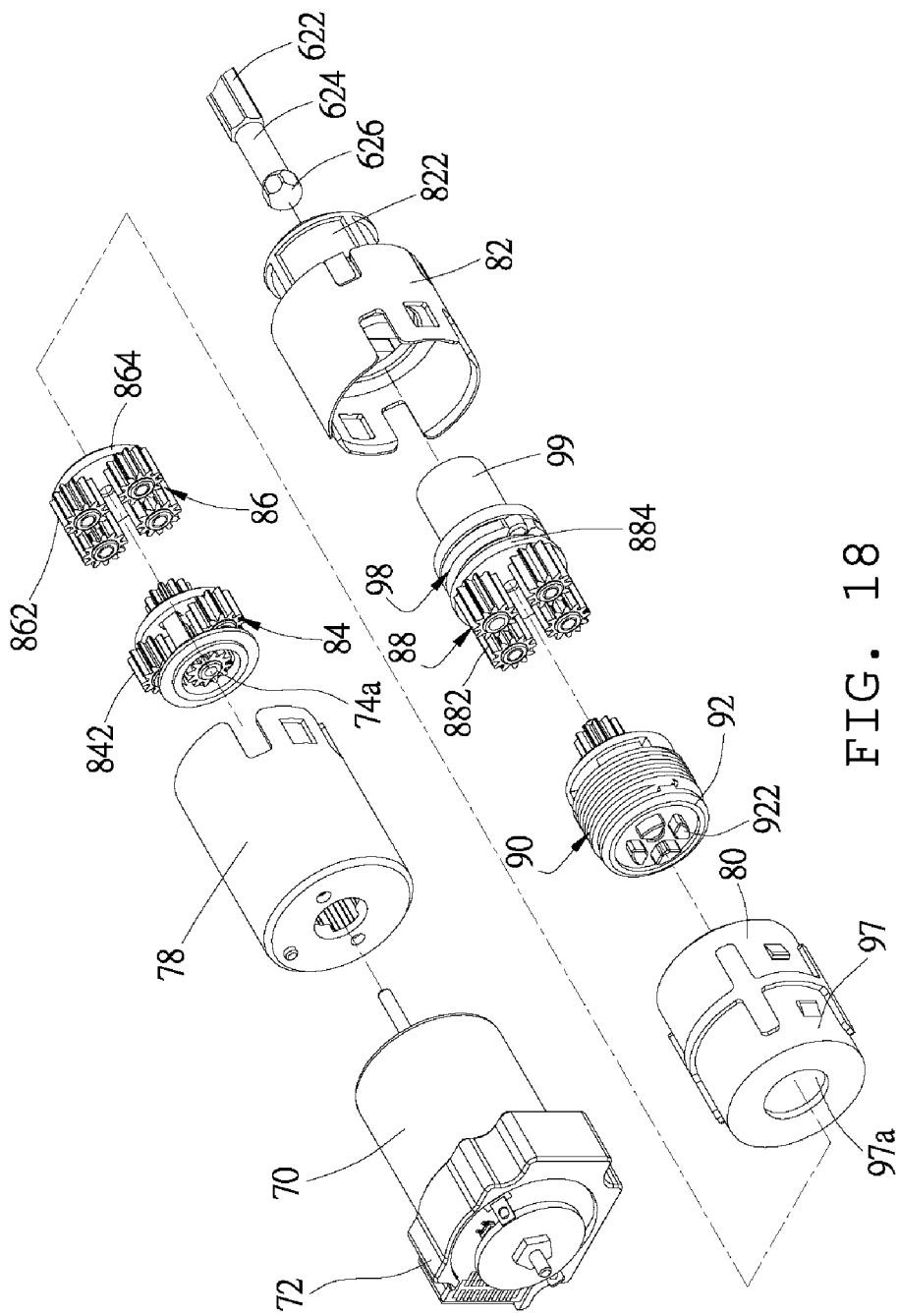
FIG. 18 is another exploded view of the epicyclic gearing decelerating device of the second embodiment seen from a different angle.
Figure 19:
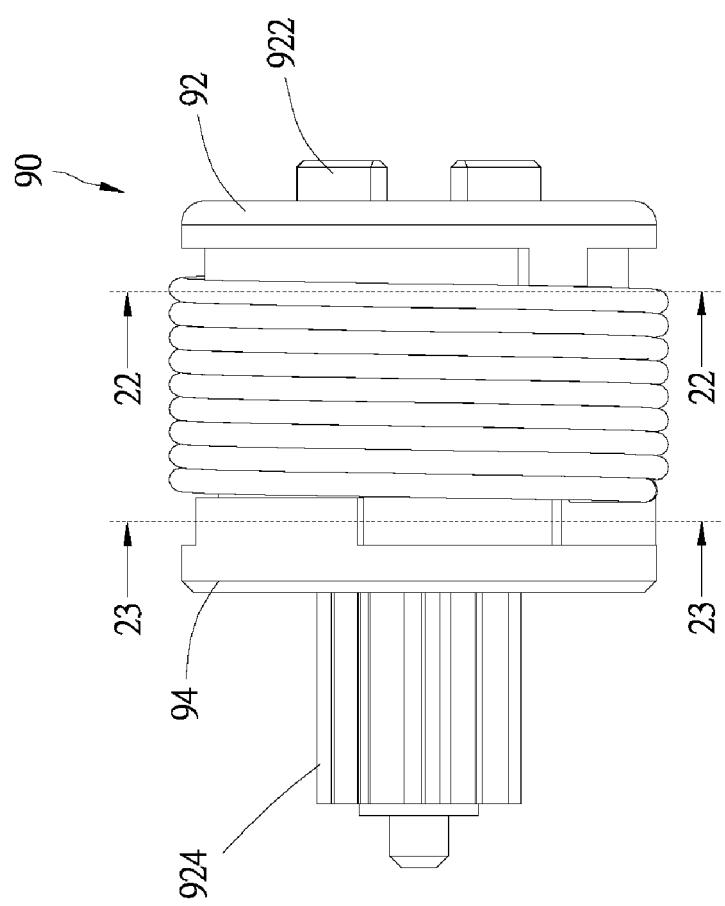
FIG. 19 is a top view of the spring brake of the second embodiment.
Figure 20:
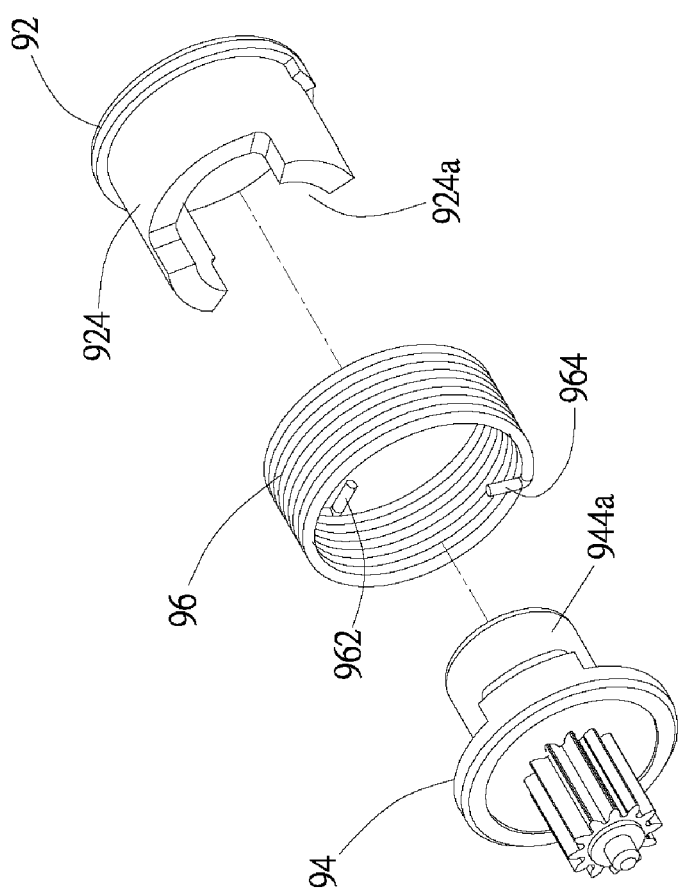
FIG. 20 is an exploded view of the spring brake of the second embodiment.
Figure 21:
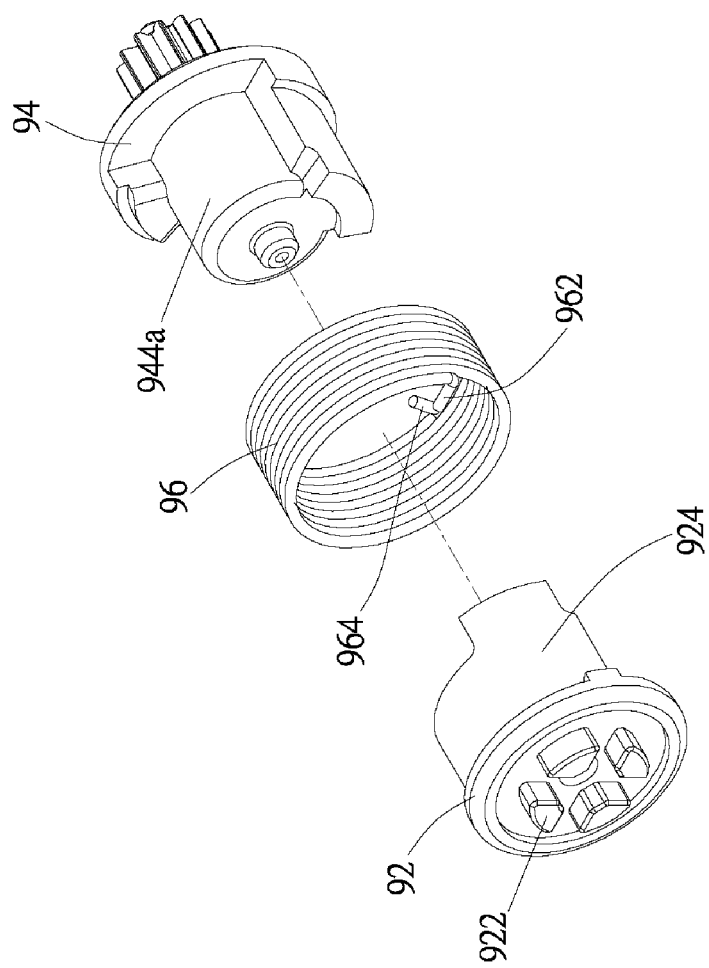
FIG. 21 is another exploded view of the spring brake of the second embodiment seen from a different angle.
Figure 24:
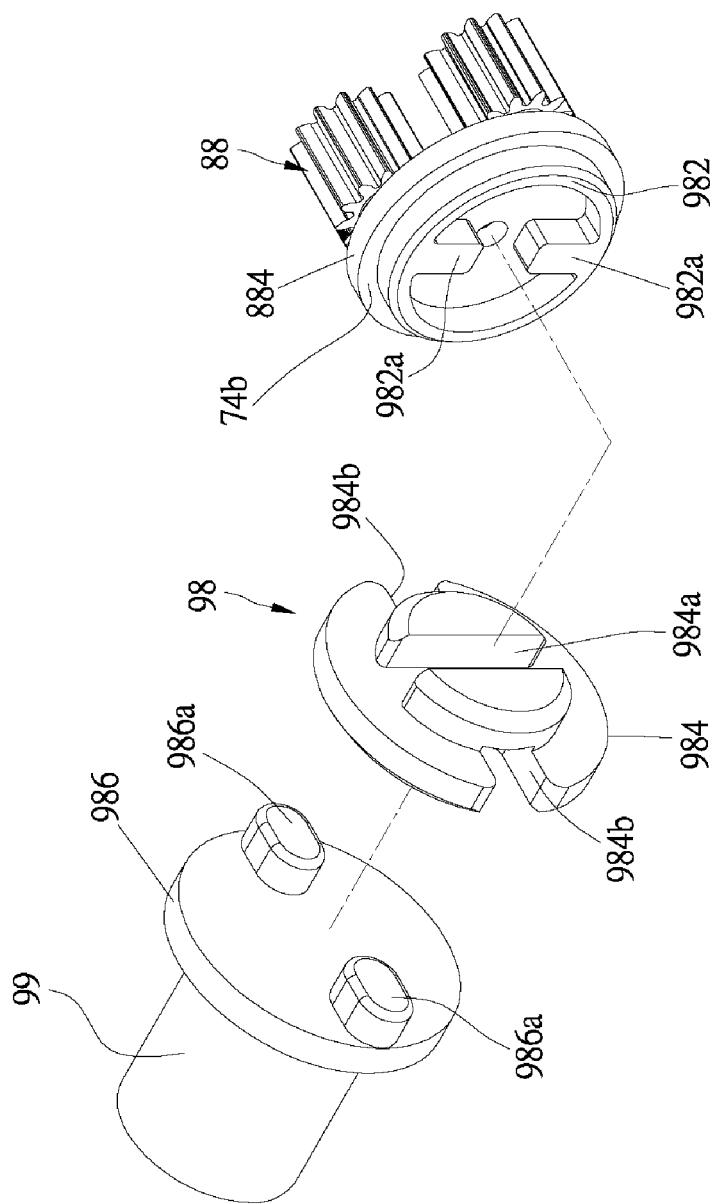
FIG. 24 is an exploded view of the first shaft coupler of the second embodiment.

A window covering 200 of a second embodiment of the present disclosure is shown in FIG. 12, which has roughly the same structures as the first embodiment, except that the structures of a spindle 62 and a driving device of the current embodiment are different from those of the first embodiment. The differences are explained in conjunction with FIG. 13 to FIG. 24 as follows.

The spindle 62 includes a body 622, an insertion section 624, and a head 626. Two ends of the insertion section 624 are respectively connected to the body 622 and the head 626. An outer diameter of the insertion section 624 is less than an outer diameter of the body 622 and an outer diameter of the head 626. An end of the head 626 has a spherical surface.

The driving device 64 includes an outer casing 66, a motor 70, and an epicyclic gearing decelerating device 74. The outer casing 66 includes a case 662 and a cushion member which is a front cover 68 as an example. The case 662 has an open end 662a, and the front cover 68 has a through hole 682. When the front cover 68 is engaged at the open end 662a, the through hole 682 communicates with an interior of the case 662. The front cover 68 is made of materials having a buffering effect, such as rubber, silicone, polyurethane, or other materials that can provide a comparable vibration damping effect.

The motor 70 and the epicyclic gearing decelerating device 74 are provided in the case 662, wherein a cushion member 72 fits around the motor. The cushion member 72 can be made of rubber, silicone, polyurethane, or other materials with a vibration-damping effect. The cushion member 72 is located between the motor 70 and the case 662 of the outer casing 66, abutting against the motor 70 and the case 662 to fix the position of the motor 70 in the case 662, and to damp the vibrations transmitted outward from the operation of the motor 70.

The epicyclic gearing decelerating device 74 has an input end 74a and an output end 74b, wherein the input end 74a is connected to the motor 70 to be driven by the motor 70 to rotate. The epicyclic gearing decelerating device 74 includes an inner casing 76, a first planet gear assembly 84, a second planet gear assembly 86, and a third planet gear assembly 88. The inner casing 76 is fixedly provided in the case 662, and the first planet gear assembly 84 is adapted to be driven by the input end 74a to rotate. The inner casing 76 includes a first case 78, a second case 80, and a third case 82. The first case 78 and the third case 82 respectively fit around two ends of the second case 80. The first case 78 has a first ring gear 782, which has a first ring portion and a second ring portion. The first planet gear assembly 84 and the second planet gear assembly 86 are located in the first case 78. First planet gears 842 of the first planet gear assembly 84 mesh with the first ring portion fixedly provided around the first planet gears 842; Second planet gears 862 of the second planet gear assembly 86 mesh with the second ring portion fixedly provided around the second planet gears 862, and are adapted to be driven by the first planet gear assembly 84 to rotate. The second case 80 has a third ring portion 802. The third planet gear assembly 88 is located in the second case 80, and third planet gears 882 of the third planet gear assembly 88 mesh with the third ring portion 802 fixedly provided around the third planet gears 882. The third case 82 has a front section 822, which fits in the through hole 682 of the front cover 68. In the current embodiment, the output end 74b of the epicyclic gearing decelerating device 74 is provided at an end of a third support 884 away from the third planet gears 882.

The driving device 64 further includes a spring brake 90, which is, different from that in the first embodiment, coupled to the second planet gear assembly 86 and the third planet gear assembly 88 of the epicyclic gearing decelerating device 74, and is located therebetween. The spring brake 90 includes an input portion 92, an output portion 94, a spring 96, and a braking case 97, wherein the braking case 97 is located between the first case 78 and the second case 80. In the current embodiment, an end of the braking case 97 is connected to the second case 80, and the first case 78 fits around the braking case 97, so that the braking case 97 is fixedly provided in the case 662. The input portion 92, the output portion 94, and the spring 96 are located in the braking case 97. The braking case 97 further has an inner circular wall 97a, which is provided between the second ring portion of the first ring gear 782 and the third ring portion 802. In the current embodiment, the braking case 97 and the second case 80 could be respectively formed at two end portions of the same case, reducing the numbers of components.

The spring 96, the input portion 92, and the output portion 94 coaxially fit around one another from outside to inside. The input portion 92 is coupled to the second planet gear assembly 86, and the output portion 94 is coupled to the third planet gear assembly 88. The spring 96 is located at a position corresponding to the inner circular wall 97a of the braking case 97.

In more details, as shown in FIG. 17 to FIG. 23, a second support 864 of the second planet gear assembly 86 is provided with a cruciform protruding portion 864a. The input portion 92 of the spring brake 90 is provided with a plurality of protrusions 922. When the second support 864 and the input portion 92 are correspondingly connected, the protruding portion 864a on the second support 864 is received between the protrusions 922. With such arrangement, when the second support 864 rotates, the protruding portion 864a pushes against the protrusions 922, driving the input portion 92 to rotate. The output portion 94 is provided with a third sun gear 942, which mesh with the third planet gears 882 of the third planet gear assembly 88. The input portion 92 has a sleeve 924, which has a hollow portion 924a, and further has a first pushing face 924b and a second pushing face 924c provided on an outer radial periphery of the hollow portion 924a. The output portion 94 has a cylindrical body 944a, and has a third pushing face 944b and a fourth pushing face 944c provided on an outer radial periphery of the cylindrical body 944a. The cylindrical body 944a goes into the hollow portion 924a. The spring 96 fits around the input portion 92 and the output portion 94; a first end 962 of the spring 96 is located between the first pushing face 924b and the third pushing face 944b (as shown in FIG. 22), and a second end 964 of the spring 96 is located between the second pushing face 924c and the fourth pushing face 944c (as shown in FIG. 23).

When the input portion 92 is driven by the second planet gear assembly 86 to rotate in the first rotation direction D1, the first pushing face 924b of the input portion 92 moves and pushes against the first end 962 of the spring 96, forcing the first end 962 to move. Due to the winding direction of the spring 96, the spring 96 would consequently shrink inward in a radial direction, and therefore would no longer contact the inner circular wall 97a of the braking case 97. After that, the first end 962 of the spring 96 would further push against the third pushing face 944b of the output portion 94, whereby the output portion 94 could be rotated in the first rotation direction D1, driving the covering material 12 to expand. When the input portion 92 rotates in the second rotation direction D2, the second pushing face 924c of the input portion 92 moves and pushes against the second end 964 of the spring 96, forcing the second end 964 to move. Due to the direction of wind of the spring 96, the spring 96 would consequently shrink inward in the radial direction, and therefore would no longer contact the inner circular wall 97a of the braking case 97. After that, the second end 964 of the spring 96 would further push against the fourth pushing face 944c of the output portion 94, whereby the output portion 94 could be rotated in the second rotation direction D2, driving the covering material 12 to collapse.

When the motor 70 stops rotating, the spindle 62 would have the tendency, due to the weight of the spindle 62, to drive the spindle 62, the third planet gear assembly 88, and the output portion 94 to rotate in the first rotation direction D1, i.e., the direction that expands the covering material 12. At this time, the fourth pushing face 944c of the output portion 94 would push against the second end 964 of the spring 96, expanding the spring 96 in the radial direction, so that the spring 96 would abut against the inner circular wall 97a of the braking case 97, whereby to brake the output portion 94, the third planet gear assembly 88, and the spindle 62.

In the current embodiment, the spring brake 90 is provided between the second planet gear assembly 86 and the third planet gear assembly 88. Therefore, the braking force that could be generated at the output portion 94 is the product of the braking force provided by the spring 96 itself and the reduction ratio of the third planet gear assembly 88, whereby to provide a better braking effect to the spindle 62. For example, if the braking force of the spring brake 90 is 0.5 N-m, and the reduction ratio formed by the third ring portion 802 and the third sun gear 942 is 4, then the braking force at the output end 74b would be 2 N-m (derived from 0.5 N-m×4). In this way, the spring brake 90 of the current embodiment could make the lower end of the covering material 12 stop more precisely at a required position, particularly when applied to a window covering having a large or heavy covering material 12, thereby avoiding the problem that the lower end 122 of the covering material 12 may be off the predetermined position due to insufficient braking force.

The structure of the spring brake 90 of the current embodiment could also be used in the first embodiment.

As shown in FIG. 13 to FIG. 24, the driving device 64 of the current embodiment further includes a sleeve 99, which is coupled to the output end 74b through a first shaft coupler 98, wherein the output end 74b is concurrently moved while the third support 884 of the third planet gear assembly 88 is driven. The sleeve 99 is located in the front section 822 of the third case 82, and has an axial hole 992. The insertion section 624 and the head 626 of the spindle 62 stick into the axial hole 992 of the sleeve 99, and an outer peripheral surface of the head 626 of the spindle 62 abuts against a wall of the axial hole 992. A gap is left between an outer peripheral surface of the insertion section 624 and the wall of the axial hole 992.

Specifically, the first shaft coupler 98 is coupled to the output end 74b of the epicyclic gearing decelerating device 74 and the spindle 62, and is located therebetween. The first shaft coupler 98 includes a first driving portion 982, a second driving portion 984, and a third driving portion 986. The first driving portion 982 is coupled to the output end 74b of the epicyclic gearing decelerating device 74, and includes two first protrusions 982a which are correspondingly provided inward from a boundary of the first driving portion 982. The second driving portion 984 is located between the first driving portion 982 and the third driving portion 986. The second driving portion 984 has a first groove 984a and two second grooves 984b, wherein the first groove 984a is provided on a face of the second driving portion 984 which faces the first driving portion 982, and goes through an axis of the second driving portion 984; the second grooves 984b are located on two opposite sides, and a longitudinal direction of the first groove 984a is perpendicular to longitudinal directions of the second grooves 984b. The first protrusions 982a fit into the first groove 984a with a tolerable space left between each of the first protrusions 982a and the first groove 984a, so that the first driving portion 982 and the second driving portion 984 are coupled in an axial direction of the second driving portion 984. Furthermore, the first protrusions 982a are slidable along the first groove 984a in the longitudinal direction thereof. The third driving portion 986 is coupled to the sleeve 99, and includes two second protrusions 986a on a face thereof corresponding to the second driving portion 984. The second protrusions 986a respectively fit into the second grooves 984b, with a tolerable space left between each of the second protrusions 986a and the corresponding one of the second grooves 984b, so that the second driving portion 984 and the third driving portion 986 are coupled in an axial direction. Furthermore, each of the second protrusions 986a is slidable along the corresponding one of the second grooves 984b in the longitudinal direction of said second groove 984b. In practice, it can also be feasible that there is only one first protrusion 982a, one second protrusion 986a, and one second groove 984b.

When the third support 884 is concurrently driven to rotate by the motor 70, the vibrations created by the rotation of the motor 70 may cause the third support 884 to move off its position. Through the above-mentioned design that the first protrusion 982a of the first shaft coupler 98 and the second protrusions 986a are respectively slidable in the first groove 984a and the second grooves 984b, the vibration energy of the motor 70 could be damped, so that the spindle 62 which goes into the sleeve 99 engaged with the third driving portion 986 could remain at the specific axial position, whereby to prevent the spindle 62 from drifting to an eccentric position due to the influence of the vibration of the motor 70. In this way, the spindle 62 could be ensured not to have frictions with other components to make noise.

As mentioned above, an end of the head 626 of the spindle 62 is a spherical surface, which allows a certain tolerance for the assembling of the sleeve 99 and the spindle 62. In the current embodiment, the axes of the sleeve 99 and the spindle 62 could form an angle not exceeding, for example, 5 degrees during the assembling. In this way, the noise caused by a non-smooth assembling process could be prevented.

Since the front cover 68 is made of shock-absorbing and cushioning materials, it could provide a vibration-damping effect when the sleeve 99 rotates in the through hole 682 of the front cover 68, which would reduce the vibration transmitted outward during the rotation of the sleeve 99, and therefore could also reduce the noise generated by the engagement between the sleeve 88 and the front cover 68.

Figure 25:
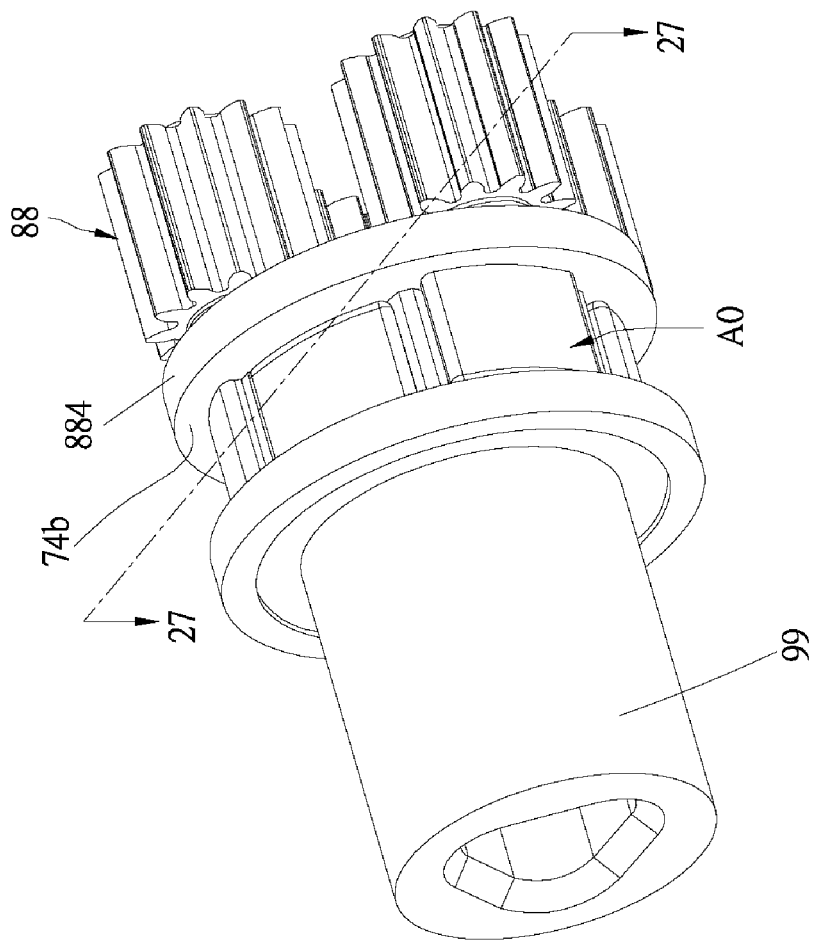
FIG. 25 is a perspective view of the second shaft coupler of the third embodiment.
Figure 26:
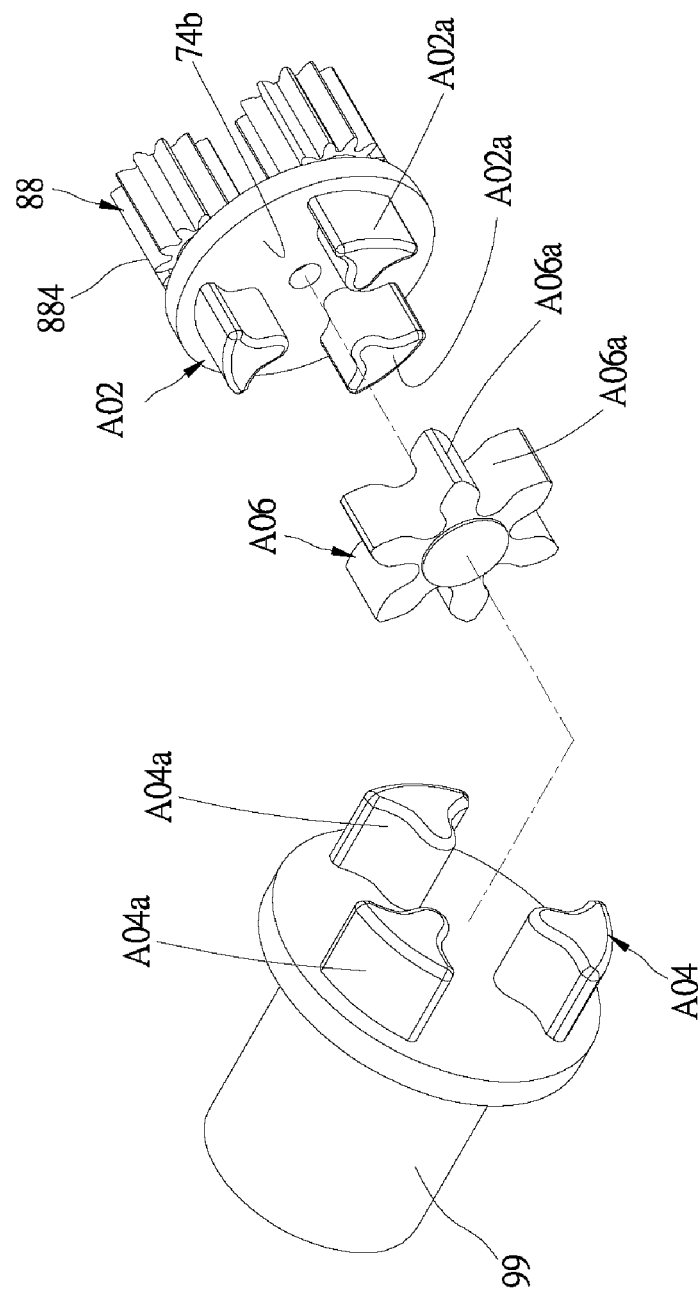
FIG. 26 is an exploded view of the second shaft coupler of the third embodiment.
Figure 27:
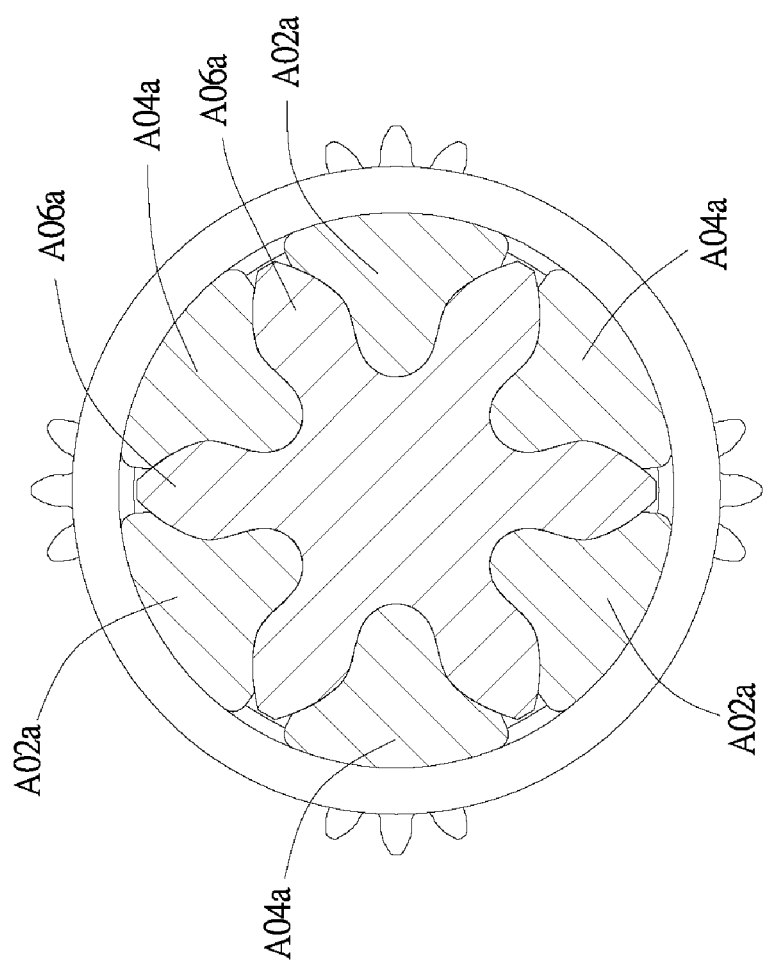
FIG. 27 is a sectional view along the 27-27 line in FIG. 25.

In a third embodiment, a shaft coupler could be a second shaft coupler AO shown in FIG. 25 to FIG. 26. The second shaft coupler AO includes a first driving portion A02, a second driving portion A04, and a connecting member A06. The first driving portion A02 is coupled to the output end 74b of the epicyclic gearing decelerating device 74, and the second driving portion A04 is coupled to the sleeve 99. Specifically, the first driving portion A02 includes a plurality of first protrusions A02a arranged at intervals, and the second driving portion A04 includes a plurality of second protrusions A04a arranged at intervals. The connecting member A06 is located between the first driving portion A02 and the second driving portion A04, and can be made of rubber, silicone, polyurethane, or other materials with a vibration-damping effect. The connecting member A06 has a plurality of blocks A06a, which extend in different radial directions. When the first driving portion A02, the connecting member A06, and the second driving portion A04 are correspondingly connected, the first protrusions A02a and the second protrusions A04a are staggered, i.e., each of the first protrusions A02a is located between two of the second protrusions A04a. Furthermore, each of the blocks A06a abuts against one of the first protrusions A02a and one of the second protrusions A04a, and is located therebetween.

With such design, the connecting member A06 could absorb the vibration energy transmitted to the third support 884 while the motor 70 is rotating, so that the position of the spindle 62 inserted in the sleeve 99 could be maintained at the axis, providing the effect of reducing the noise.

It must be pointed out that the embodiments described above are only some embodiments of the present disclosure. All equivalent structures which employ the concepts disclosed in this specification and the appended claims should fall within the scope of the present disclosure.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A driving device of a window covering, wherein the window covering includes a covering material and a spindle for raising or lowering the covering material; the driving device comprising:
   a motor having a shaft;
   an epicyclic gearing decelerating device having an input end and an output end, wherein the input end is connected to the shaft, and the output end is connected to the spindle; the epicyclic gearing decelerating device comprises a first planet gear assembly, which is coupled to and located between the input end and the output end, and a first ring portion; the first planet gear assembly comprises a plurality of first planet gears; the first ring portion is fixedly provided around the first planet gears, and the first planet gears are adapted to be driven by the input end to rotate along the first ring portion; each of the first planet gears has a Shore A durometer hardness of 45 to 90; and
   a shaft coupler coupled to and located between the output end of the epicyclic gearing decelerating device and the spindle; wherein the shaft coupler comprises a first driving portion, a second driving portion, and a third driving portion; the first driving portion is coupled to the output end of the epicyclic gearing decelerating device; the first driving portion comprises a first protrusion; the third driving portion is coupled to the spindle; the third driving portion comprises a second protrusion; the second driving portion is provided between the first driving portion and the third driving portion; the second driving portion has a first groove, which is adapted to be inserted by the first protrusion, and a second groove, which is adapted to be inserted by the second protrusion; longitudinal directions of the first groove and the second groove are perpendicular to each other; the first protrusion and the first groove have a tolerable space left therebetween; the second protrusion and the second groove also have a tolerable space left therebetween, so that the first protrusion is slidable along the first groove in the longitudinal direction thereof, and the second protrusion is slidable along the second groove in the longitudinal direction thereof.

2. The driving device of claim 1, wherein the epicyclic gearing decelerating device comprises a second planet gear assembly and a second ring portion; the second planet gear assembly is coupled to and located between the first planet gear assembly and the output end; the second planet gear assembly comprises a plurality of second planet gears, and the second ring portion is fixedly provided around the second planet gears; the second planet gears are adapted to be driven by the first planet gear assembly to rotate along the second ring portion; each of the second planet gears has a Shore A durometer hardness of 45 to 90.

3. The driving device of claim 2, wherein the epicyclic gearing decelerating device comprises a third planet gear assembly and a third ring portion; the third planet gear assembly is coupled to and located between the second planet gear assembly and the output end; the third planet gear assembly comprises a plurality of third planet gears, and the third ring portion is fixedly provided around the third planet gears; the third planet gears are adapted to be driven by the second planet gear assembly to rotate along the third ring portion; a module of each of the third planet gears is greater than a module of each of the first planet gears and each of the second planet gears.

4. The driving device of claim 3, further comprising a spring brake, which comprises an input portion, an output portion, a spring, and a braking case, wherein the braking case is fixedly provided, and receives the input portion, the output portion, and the spring; the spring fits between the input portion and the output portion; the input portion is coupled to the second planet gear assembly, and the output portion is coupled to the third planet gear assembly; when the output portion is driven by the spindle of the window covering, the output portion has a tendency to drive the third planet gear assembly to rotate in a rotation direction which expands the covering material, and therefore the output portion pushes against the spring, which makes the spring expand in a radial direction to abut against the braking case, stopping the spindle, the third planet gear assembly, and the output portion from rotating.

5. The driving device of claim 2, wherein each of the second planet gear is a thermoplastic elastomer.

6. The driving device of claim 5, wherein a material of each of the thermoplastic elastomers is selected from a group consisting of thermoplastic rubber, thermoplastic vulcanizate, thermoplastic polyurethanes, and thermoplastic polyether ester elastomer.

7. The driving device of claim 1, further comprising a spring brake, which comprises an input portion, an output portion, a spring, and a braking case, wherein the braking case is fixedly provided, and receives the input portion, the output portion, and the spring; the spring fits between the input portion and the output portion, the input portion is coupled to the output end of the epicyclic gearing decelerating device, and the output portion is coupled to the spindle; when the output portion is driven by the spindle of the window covering, the output portion has a tendency to drive the epicyclic gearing decelerating device to rotate in a rotation direction which extends the covering material, and therefore the output portion pushes against the spring, which makes the spring expand in a radial direction to abut against the braking case, stopping the spindle, the output portion, and the epicyclic gearing decelerating device from rotating.

8. The driving device of claim 1, further comprising an outer casing, which comprises a case and a cushion member, wherein the motor and the epicyclic gearing decelerating device are provided in the case, and the case has an open end; the cushion member is engaged at the open end, and further has a through hole; the output end of the epicyclic gearing decelerating device is coupled to the spindle through the through hole.

9. The driving device of claim 1, further comprising an outer casing and a cushion member, wherein the motor and the epicyclic gearing decelerating device are provided in the outer casing, and the cushion member is provided between the epicyclic gearing decelerating device and the outer casing.

10. The driving device of claim 1, further comprising an outer casing and a cushion member, wherein the motor and the epicyclic gearing decelerating device are provided in the outer casing, and the cushion member is provided between the motor and the outer casing.

11. The driving device of claim 1, wherein each of the first planet gears is a thermoplastic elastomer.

12. The driving device of claim 11, wherein a material of each of the thermoplastic elastomers is selected from a group consisting of thermoplastic rubber, thermoplastic vulcanizate, thermoplastic polyurethanes, and thermoplastic polyether ester elastomer.

13. A window covering, comprising:
a housing;
a covering material;
a spindle provided at the housing, wherein the spindle is connected to the covering material, and is adapted to drive the covering material to expand or collapse; and
a driving device provided at the housing, wherein the driving device comprises a motor, an epicyclic gearing decelerating device and a shaft coupler;
the motor has a shaft; the epicyclic gearing decelerating device has an input end and an output end, wherein the input end is connected to the shaft, and the output end is connected to the spindle; the epicyclic gearing decelerating device comprises a first planet gear assembly, which is coupled to and located between the input end and the output end, and a first ring portion; the first planet gear assembly comprises a plurality of first planet gears; the first ring portion is fixedly provided around the first planet gears, and the first planet gears are adapted to be driven by the input end to rotate along the first ring portion; each of the first planet gears has a Shore A durometer hardness of 45 to 90; the shaft coupler is coupled to and located between the output end of the epicyclic gearing decelerating device and the spindle; wherein the shaft coupler comprises a first driving portion, a second driving portion, and a third driving portion; the first driving portion is coupled to the output end of the epicyclic gearing decelerating device; the first driving portion comprises a first protrusion; the third driving portion is coupled to the spindle; the third driving portion comprises a second protrusion; the second driving portion is provided between the first driving portion and the third driving portion; the second driving portion has a first groove, which is adapted to be inserted by the first protrusion, and a second groove, which is adapted to be inserted by the second protrusion; longitudinal directions of the first groove and the second groove are perpendicular to each other; the first protrusion and the first groove have a tolerable space left therebetween; the second protrusion and the second groove also have a tolerable space left therebetween, so that the first protrusion is slidable along the first groove in the longitudinal direction thereof, and the second protrusion is slidable along the second groove in the longitudinal direction thereof.

14. The window covering of claim 13, wherein the driving device comprises an outer casing and a cushion member; the motor and the epicyclic gearing decelerating device are located in the outer casing, and the cushion member is provided between the outer casing and the housing.

15. The window covering of claim 13, wherein the driving device comprises an outer casing, which comprises a case and a cushion member; the motor and the epicyclic gearing decelerating device are provided in the case, and the case has an open end; the cushion member is engaged at the open end, and further has a through hole; the output end of the epicyclic gearing decelerating device is coupled to the spindle through the through hole.

16. The window covering of claim 13, wherein the driving device comprises an outer casing and a cushion member; the motor and the epicyclic gearing decelerating device are provided in the outer casing, and the cushion member is provided between the epicyclic gearing decelerating device and the outer casing.

17. The window covering of claim 13, wherein the driving device comprises an outer casing and a cushion member; the motor and the epicyclic gearing decelerating device are provided in the outer casing, and the cushion member is provided between the motor and the outer casing.

18. The window covering of claim 13, wherein the epicyclic gearing decelerating device comprises a second planet gear assembly and a second ring portion; the second planet gear assembly is coupled and located between the first planet gear assembly and the output end; the second planet gear assembly comprises a plurality of second planet gears; the second ring portion is fixedly provided around the second planet gears, and the second planet gears are adapted to be driven by the first planet gear assembly to rotate along the second ring portion; each of the second planet gears has a Shore A durometer hardness of 45 to 90.

19. The window covering of claim 18, wherein the epicyclic gearing decelerating device comprises a third planet gear assembly and a third ring portion; the third planet gear assembly is coupled to and located between the second planet gear assembly and the output end; the third planet gear assembly comprises a plurality of third planet gears; the third ring portion is fixed provided around the third planet gears, and the third planet gears are adapted to be driven by the second planet gear assembly to rotate along the third ring portion; a module of each of the third planet gears is greater than a module of each of the first planet gears and each of the second planet gears.

20. The window covering of claim 19, wherein the driving device further comprises a spring brake, which comprises an input portion, an output portion, a spring, and a braking case; the braking case is fixedly provided at the housing, and receives the input portion, the output portion, and the spring; the spring fits between the input portion and the output portion; the input portion is coupled to the second planet gear assembly, and the output portion is coupled to the third planet gear assembly; when the output portion is driven by the spindle of the window covering, the output portion has a tendency to drive the third planet gear assembly to rotate in a rotation direction which expands the covering material, and therefore the output portion pushes against the spring, which makes the spring expand in a radial direction to abut against the braking case, stopping the spindle, the third planet gear assembly, and the output portion from rotating.

21. The window covering of claim 18, wherein each of the second planet gear is a thermoplastic elastomer.

22. The window covering of claim 21, wherein a material of each of the thermoplastic elastomers is selected from a group consisting of thermoplastic rubber, thermoplastic vulcanizate, thermoplastic polyurethanes, and thermoplastic polyether ester elastomer.

23. The window covering of claim 13, wherein the driving device further comprises a spring brake, which comprises an input portion, an output portion, a spring, and a braking case; the braking case is fixedly provided at the housing, and receives the input portion, the output portion, and the spring; the spring fits between the input portion and the output portion, the input portion is coupled to the output end of the epicyclic gearing decelerating device, and the output portion is coupled to the spindle; when the output portion is driven by the spindle of the window covering, the output portion has a tendency to drive the epicyclic gearing decelerating device to rotate in a rotation direction which extends the covering material, and therefore the output portion pushes against the spring, which makes the spring expand in a radial direction to abut against the braking case, stopping the spindle, the output portion, and the epicyclic gearing decelerating device from rotating.

24. The window covering of claim 13, wherein the driving device comprises a sleeve, which is coupled to the output end of the epicyclic gearing decelerating device; the sleeve further has an axial hole; the spindle comprises a body, an insertion section, and a head; two ends of the insertion section are respectively connected to the body and the head; an outer diameter of the insertion section is less than an outer diameter of the body and an outer diameter of the head; the insertion section and the head go into the axial hole; an end of the head is a spherical surface, and an outer peripheral surface of the head abuts against a wall of the axial hole.

25. The window covering of claim 13, wherein each of the first planet gears is a thermoplastic elastomer.

26. The window covering of claim 25, wherein a material of each of the thermoplastic elastomers is selected from a group consisting of thermoplastic rubber, thermoplastic vulcanizate, thermoplastic polyurethanes, and thermoplastic polyether ester elastomer.

\* \* \* \* \*